United States Patent
Hida et al.

(10) Patent No.: US 9,384,123 B2
(45) Date of Patent: Jul. 5, 2016

(54) MEMORY SYSTEM

(75) Inventors: Toshikatsu Hida, Kanagawa (JP); Hiroshi Yao, Kanagawa (JP); Norikazu Yoshida, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 145 days.

(21) Appl. No.: 13/328,496

(22) Filed: Dec. 16, 2011

(65) Prior Publication Data

US 2012/0159051 A1 Jun. 21, 2012

(30) Foreign Application Priority Data

Dec. 16, 2010 (JP) .................. 2010-280720
Apr. 28, 2011 (JP) .................. 2011-102219

(51) Int. Cl.
*G06F 12/00* (2006.01)
*G06F 13/00* (2006.01)
*G06F 13/28* (2006.01)
*G06F 12/02* (2006.01)
*G06F 3/06* (2006.01)

(52) U.S. Cl.
CPC .......... *G06F 12/0246* (2013.01); *G06F 3/0611* (2013.01); *G06F 3/0658* (2013.01); *G06F 3/0659* (2013.01); *G06F 3/0688* (2013.01); *G06F 2212/7205* (2013.01)

(58) Field of Classification Search
CPC .............................. G06F 3/0658; G06F 3/0688
USPC ............................................. 711/102
See application file for complete search history.

(56) References Cited

U.S. PATENT DOCUMENTS 4,340,933 A * 7/1982 Miu et al. .................. 714/53
4,344,132 A * 8/1982 Dixon et al. ................ 710/60

(Continued)

FOREIGN PATENT DOCUMENTS

JP    2007-018219    1/2007
JP    2009-211231    9/2009

(Continued)

OTHER PUBLICATIONS

Definition of buffer (computer science), The Free Dictionary, retrieved from http://www.thefreedictionary.com/buffer on Oct. 14, 2013.*

(Continued)

*Primary Examiner* — Sanjiv Shah
*Assistant Examiner* — Daniel C Chappell
(74) *Attorney, Agent, or Firm* — Oblon, McClelland, Maier & Neustadt, L.L.P.

(57) ABSTRACT

According to one embodiment, a memory system includes a non-volatile memory, a resource managing unit that reclaims resources associated with the non-volatile memory and increases the resources, when the usage of the resources associated with the non-volatile memory reaches the predetermined amount, a transmission rate setting unit that calculates a setting value of the transmission rate to receive the write data from a host device, and a transmission control unit that receives the write data from the host device and transmits the received write data to the non-volatile memory. The transmission rate setting unit calculates a small setting value when the usage of the resources associated with the non-volatile memory increases. The transmission control unit executes the reception of the write data from the host device at the transmission rate of the setting value, while the resource managing unit reclaims the resources.

9 Claims, 26 Drawing Sheets

(56) References Cited

U.S. PATENT DOCUMENTS

| | | | | |
|---|---|---|---|---|
| 5,623,693 | A * | 4/1997 | Ashton et al. | 710/5 |
| 6,581,132 | B1 * | 6/2003 | Kakinuma | G11C 29/765 |
| | | | | 711/103 |
| 6,591,329 | B1 * | 7/2003 | Kakinuma | G06F 12/0292 |
| | | | | 711/103 |
| 6,636,909 | B1 * | 10/2003 | Kahn | G06F 3/0601 |
| | | | | 710/29 |
| 6,772,352 | B1 * | 8/2004 | Williams | G11C 11/406 |
| | | | | 711/104 |
| 6,792,482 | B2 * | 9/2004 | Iwatani | G06F 3/0613 |
| | | | | 710/36 |
| 7,343,451 | B2 * | 3/2008 | Suzuki et al. | 711/114 |
| 7,739,416 | B2 * | 6/2010 | Chikusa et al. | 710/2 |
| 7,818,494 | B2 * | 10/2010 | Inoue | G06F 3/061 |
| | | | | 360/75 |
| 7,904,640 | B2 | 3/2011 | Yano et al. | |
| 7,949,910 | B2 | 5/2011 | Kanno et al. | |
| 7,953,920 | B2 | 5/2011 | Yano et al. | |
| 7,958,411 | B2 | 6/2011 | Kanno et al. | |
| 7,962,688 | B2 | 6/2011 | Yano et al. | |
| 8,015,347 | B2 | 9/2011 | Kitsunai et al. | |
| 8,060,797 | B2 | 11/2011 | Hida et al. | |
| 8,065,470 | B2 | 11/2011 | Yano et al. | |
| 8,065,471 | B2 | 11/2011 | Yano et al. | |
| 8,341,331 | B2 * | 12/2012 | Meir | G06F 12/0246 |
| | | | | 711/103 |
| 8,401,136 | B2 * | 3/2013 | Fujiwara | G06F 1/04 |
| | | | | 360/70 |
| 9,230,671 | B2 * | 1/2016 | Hirashima | G11C 16/26 |
| 2007/0058651 | A1 * | 3/2007 | Bowen | H04L 47/30 |
| | | | | 370/412 |
| 2007/0255870 | A1 * | 11/2007 | Chikusa | G06F 3/0613 |
| | | | | 710/74 |
| 2008/0034174 | A1 | 2/2008 | Traister et al. | |
| 2009/0201599 | A1 * | 8/2009 | Kanenaga | G11B 5/86 |
| | | | | 360/55 |
| 2009/0222628 | A1 | 9/2009 | Yano et al. | |
| 2009/0237825 | A1 * | 9/2009 | Sato et al. | 360/39 |
| 2010/0110892 | A1 * | 5/2010 | Lai | H04L 47/25 |
| | | | | 370/235 |
| 2010/0161885 | A1 | 6/2010 | Kanno et al. | |
| 2010/0223424 | A1 | 9/2010 | Kitsunai et al. | |
| 2010/0281204 | A1 | 11/2010 | Yano et al. | |
| 2011/0099349 | A1 | 4/2011 | Yano et al. | |
| 2011/0238899 | A1 | 9/2011 | Yano et al. | |
| 2013/0179595 | A1 * | 7/2013 | Chikusa et al. | 710/2 |

FOREIGN PATENT DOCUMENTS

| | | | | |
|---|---|---|---|---|
| JP | 2009-545819 | | 12/2009 | |
| JP | 2010-157139 | | 7/2010 | |
| JP | WO 2010074352 A1 | * | 7/2010 | G06F 12/0246 |
| WO | WO2009110126 | * | 9/2009 | G06F 12/08 |
| WO | WO2010/074352 A1 | * | 7/2010 | G06F 12/08 |
| WO | WO2010074352 | * | 7/2010 | G06F 12/08 |

OTHER PUBLICATIONS

Deinition of hysteretic, Merriam-Webster Dictionary, retrieved from http://www.merriam-webster.com/dictionary/hysteretic on Oct. 10, 2013 (1 page).*
Technical Note NAND Flash 101: An Introduction to NAND Flash and How to Design It in to Your Next Product, Micron Technologies, Apr. 2010, retrieved from https://www.google.com/url?sa=t&rct=j&q=&esrc=s&source=web&cd=4&cad=rja&ved=0CEYQFjAD&url=https%3A%2F%2Fwww.micron.com%2F~%2Fmedia%2Fdocuments%2FProducts%FTechnical%2520Note%2FNAND%2520Flash%2Ftn291.*
Definition of garbage collection, Free Online Definition of Computing, Aug. 25, 1997, retrieved from http://foldoc.org/garbage+collection on Mar. 22, 2014 (2 pages).*
U.S. Appl. No. 13/052,146, filed Mar. 21, 2011, Naoki Ootsuka, et al.
Japanese Office Action mailed on Dec. 19, 2014 in Japanese Patent Application No. 2014-085373, with English translation.

* cited by examiner

FIG.8

| | WHEN COMMAND RECEPTION INTERVAL TIME IS LONGER THAN tth | WHEN COMMAND RECEPTION INTERVAL TIME IS SHORTER THAN tth |
|---|---|---|
| TRANSMISSION RATE (MODE 1) | r1a | r1b, WHEREIN r1b<r1a |
| TRANSMISSION RATE (MODE 2) | r2a | r2b, WHEREIN r2b<r2a |
| DETERMINED THRESHOLD VALUE BETWEEN MODES 0 AND 1 | T1a (MODE 0 → MODE 1), T4a (MODE 1 → MODE 0) | T1b (MODE 0 → MODE 1), T4b (MODE 1 → MODE 0), WHEREIN T1b<T1a, T4b<T4a |
| DETERMINED THRESHOLD VALUE BETWEEN MODES 1 AND 2 | T2a (MODE 0 → MODE 1), T3a (MODE 1 → MODE 0) | T2b (MODE 0 → MODE 1), T3b (MODE 1 → MODE 0), WHEREIN T2b<T2a, T3b<T3a |
| DETERMINED THRESHOLD VALUE BETWEEN MODES 2 AND 3 | Tlimita | Tlimitb, WHEREIN Tlimitb<Tlimita |

FIG.9

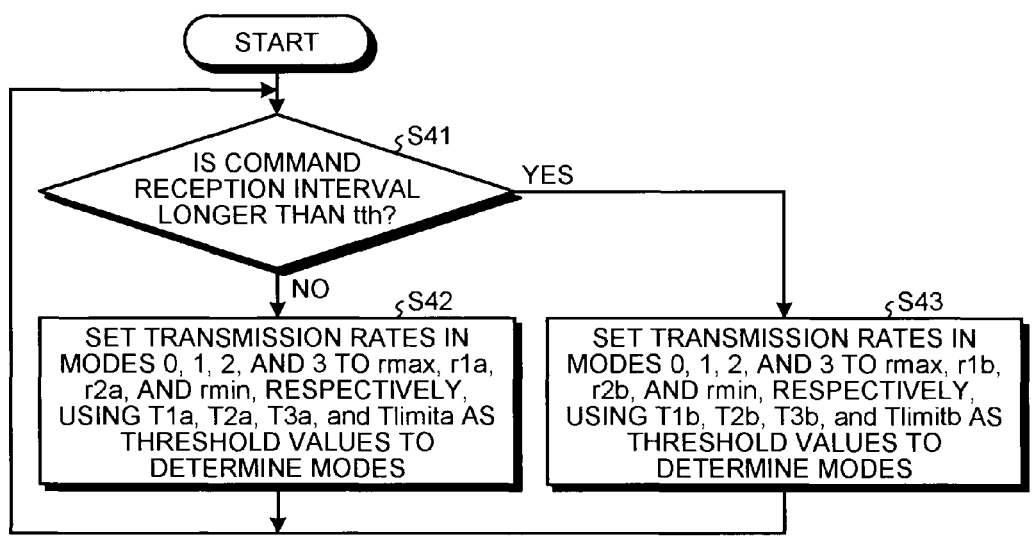

FIG.11

| LOGICAL ADDRESS | PHYSICAL ADDRESS | |
|---|---|---|
| l0 | p0 | ⎫ |
| l1 | p1 | ⎬ UPDATE UNIT TABLE a |
| l2 | p2 | ⎬ |
| l3 | p3 | ⎭ |
| ⋮ | ⋮ | ⎬ UPDATE UNIT TABLE b |

67

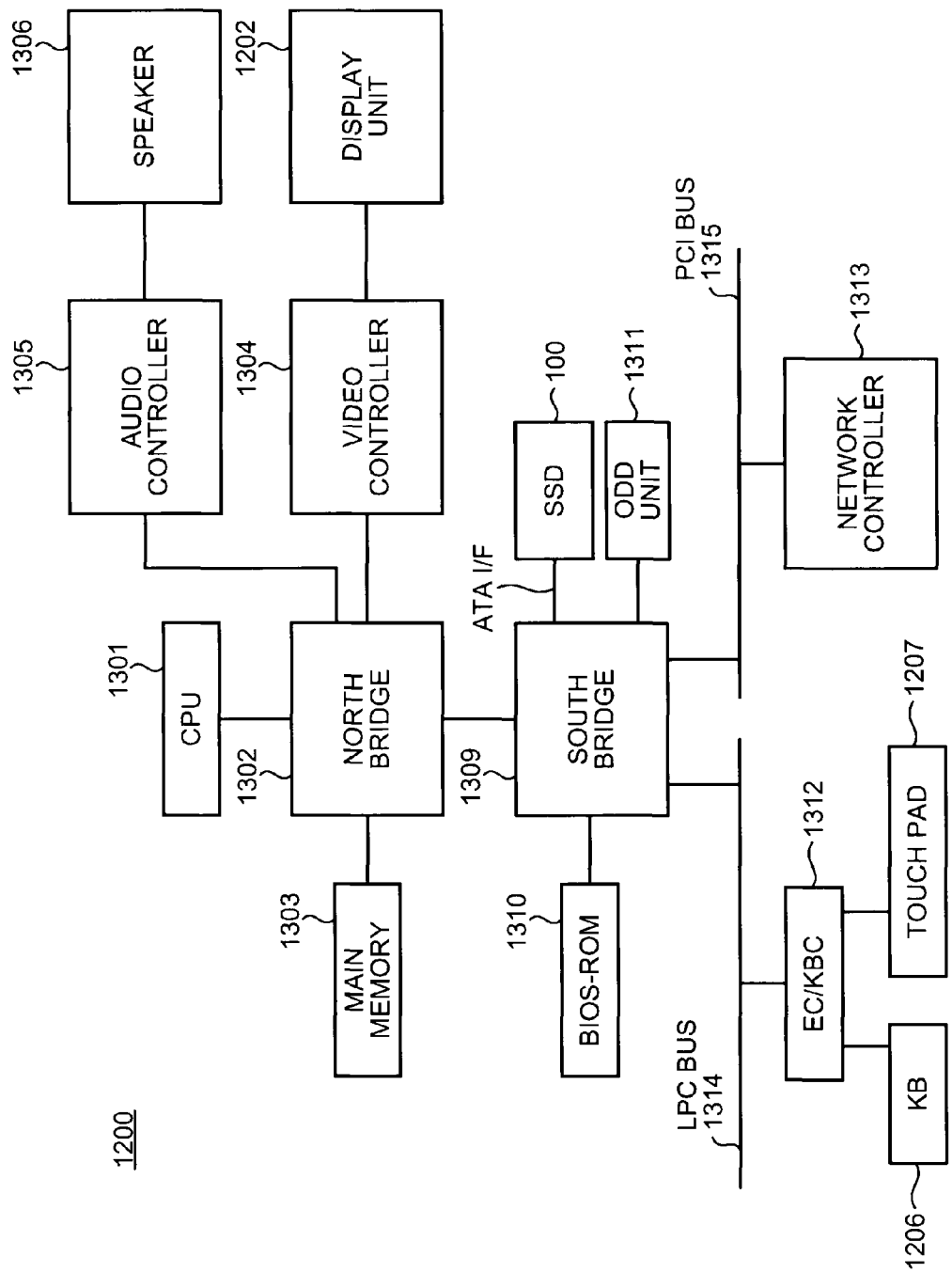

MEMORY SYSTEM

CROSS-REFERENCE TO RELATED APPLICATIONS

This application is based upon and claims the benefit of priority from the prior Japanese Patent Application No. 2010-280720, filed on Dec. 16, 2010 and the prior Japanese Patent Application No. 2011-102219, filed on Apr. 28, 2011; the entire contents of all of which are incorporated herein by reference.

FIELD

Embodiments described herein relate generally to a memory system.

BACKGROUND

In general, a solid state drive (SSD) that is mounted with a memory cell array configured using a NAND-type non-volatile element has attracted attention as an external storage device that is used for a computer system. A flash memory has advantages in a high-speed operation and a lightweight body over a magnetic disk device.

The SSD executes a process called a garbage collection that records update data in blocks of the memory cell array page by page and generates available blocks by performing reclaiming operation, when the available blocks are exhausted.

BRIEF DESCRIPTION OF THE DRAWINGS

FIG. 8 is a diagram illustrating the transmission rate and a threshold value in the case in which the transmission rate and the threshold value are changed according to command reception interval time;

FIG. 9 is a flowchart illustrating an operation of determining a relation between each mode and the transmission rate and the threshold value by the transmission rate setting unit;

FIG. 11 is a diagram illustrating an example of the data configuration of an address translation table 67;

FIG. 32 is a diagram illustrating an example of the functional configuration of the personal computer.

DETAILED DESCRIPTION

In general, according to one embodiment, a memory system includes a non-volatile memory that stores write requested data from a host device, a resource managing unit that reclaims resources associated with the non-volatile memory and increases the resources, when the usage of the resources associated with the non-volatile memory reaches the predetermined amount, a transmission rate setting unit that calculates a setting value of the transmission rate to receive the write data from the host device, and a transmission control unit that receives the write data from the host device and transmits the received write data to the non-volatile memory. The transmission rate setting unit calculates a small setting value when the usage of the resources associated with the non-volatile memory increases. The transmission control unit executes the reception of the write data from the host device at the transmission rate of the setting value calculated by the transmission rate setting unit, while the resource managing unit reclaims the resources.

Exemplary embodiments of the memory system will be explained below in detail with reference to the accompanying drawings. The present invention is not limited to the following embodiments. In the embodiments to be described below, an example of the case in which the memory system according to the embodiments of the invention is applied to an SSD will be described. However, an application object of the memory system is not limited to the SSD.

Figure 1:
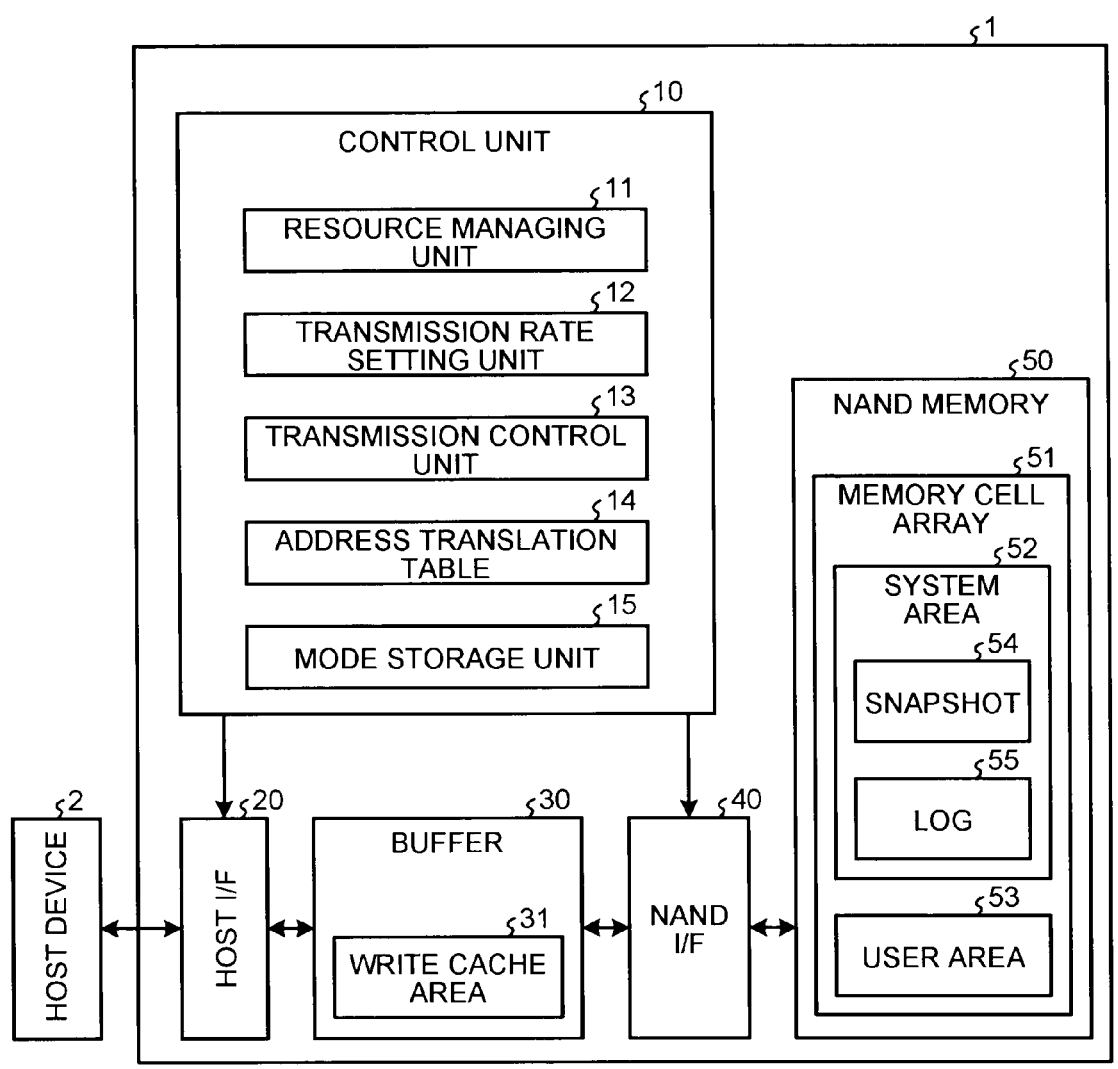
FIG. 1 is a block diagram illustrating the configuration of an SSD according to an embodiment of the invention.

FIG. 1 is a block diagram illustrating the configuration of an SSD according to a first embodiment of the invention. As illustrated in FIG. 1, an SSD 1 is connected to a host device 2 such as a personal computer through a communication interface such as an advanced technology attachment (ATA) standard and functions as an external storage device of the host device 2. A read/write request that is received from the host device 2 by the SSD 1 includes a host address (for example, Logical Block Addressing (LBA)) and a size (for example, the number of sectors; one sector has 512 B) of read/write requested data.

The SSD 1 includes a control unit 10, a host interface (I/F) 20, a buffer 30, a NAND I/F 40, and a NAND memory 50.

The host I/F 20 controls communication with the host device 2, under control from the control unit 10. The control unit 10 analyzes a command transmitted from the host device 2 through the host I/F 20 and controls writing of data to the NAND memory 50 or reading of data from the NAND memory 50, according to the command.

The NAND I/F 40 controls the NAND memory 50 and includes an error correcting circuit.

The buffer 30 is configured, for example, using a dynamic random access memory (DRAM) and is used as a buffer for data transmission between the host device 2 and the NAND memory 50. In particular, the buffer 30 includes a write cache area 31 that caches write data received from the host device 2 through the host I/F 20. The write data that is cached in the write cache area 31 is moved to the NAND memory 50 through the NAND I/F 40, when commands (hereinafter, referred to as flash command) urging non-volatilization of data in the write cache area 31, such as a flash command, a sleep command, or a standby command from the host device 2, are received or predetermined timing when data overflow is generated in the write cache area 31, separately from an instruction from the host device 2.

The NAND memory 50 includes a memory cell array 51 that is configured using a NAND-type non-volatile storage element. In the NAND memory 50, data can be read and written in a unit called a page. In addition, plural pages are collected to constitute a storage area of a unit of erasure called a block. A size of one page is, for example, 4 KB and 64 pages constitute one block. The plural blocks are collected to constitute the memory cell array 51.

Herein, a writing system for the NAND memory 50 will be described. In the NAND-type memory cell array 51, a system to be described below is adopted. First, before writing, the blocks need to be erased. That is, in the NAND memory 50, writing can be sequentially executed with respect to pages where writing is not yet executed, among the erased blocks, and overwriting cannot be executed with respect to pages where writing is already executed. Writing of data according to the request from the host device 2 is designated by a logical address (LBA) used by the host device 2. Meanwhile, writing of data with respect to the NAND memory 50 is executed in ascending order of the pages according to the physical storage positions (physical addresses) of the NAND memory 50, regardless of the logical addresses. Correspondence relations of the physical addresses and the logical addresses are stored as an address translation table 14 to be described below in the SSD 1. If the logical address designated in the data writing request is designated again and writing of new data is requested from the host, the SSD 1 executes writing of new data with respect to the pages where writing is not yet executed, among the erased blocks. At this time, the SSD 1 invalidates the pages where previous writing is executed to correspond to the logical address and validates the pages where writing of the new data is executed.

Figure 2:
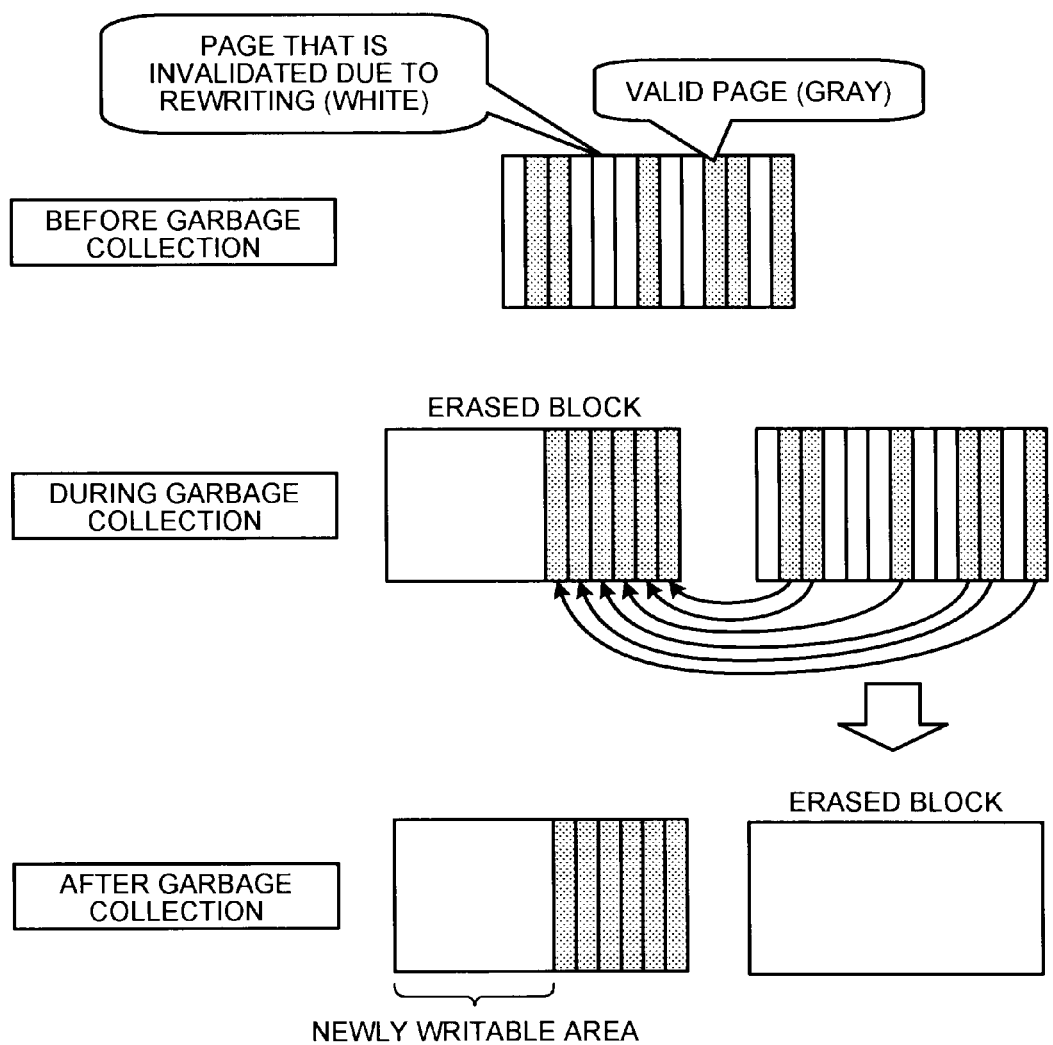
FIG. 2 is a conceptual diagram illustrating a garbage collection.

In a recordable system, if writing is continuously executed and thus the number of blocks (empty blocks) used in a writing process decreases and the number of invalidated pages increases, the capacity for writing in the NAND memory 50 decreases. For this reason, the SSD 1 executes a garbage collection at appropriate timing. FIG. 2 is a conceptual diagram illustrating the garbage collection. The SSD 1 collects data (called valid data) written at the non-invalidated physical addresses and rewrites the valid data to an empty block, among the blocks including the invalidated pages, and moves the valid data. Then, the SSD 1 erases the corresponding block and generates a new empty block. By executing the garbage collection by the SSD 1, a block where writing cannot be executed becomes a block where writing can be newly executed and an empty block can be secured. Even in the block where the valid data is written by the movement, if there are pages where writing is not yet executed, writing can be newly executed with respect to the corresponding pages.

In order to execute the garbage collection, a copy is generated once or more. In addition, the number of times of copying further increases according to a situation where the valid data in the block is arranged. When locality does not exist in access from the host device 2, the number of times of copying may extraordinarily increase. In regards to the usage of the blocks, when there exist a large number of blocks where the valid data amount is small, a large number of use blocks are decreased by one garbage collection, and when there exist a large number of blocks where the valid data amount is large, the number of use blocks is not decreased by one garbage collection. That is, the number of times of copying changes according to the number of blocks where the valid data amount is small. As such, when the number of blocks having the small valid data amount is small, it takes very long time to generate the empty blocks by the garbage collection. As a result, a situation where reception of a command from the host device 2 is in standby is generated.

Therefore, in the embodiment of the invention, the transmission rate with the host device 2 is limited in stepwise according to the number of use blocks (blocks where the valid data is recorded). The transmission rate is limited by inserting waiting period into data transmission period. For example, the waiting time is inserted at the time of execution of the data transmission command from the host device 2.

Figure 3:
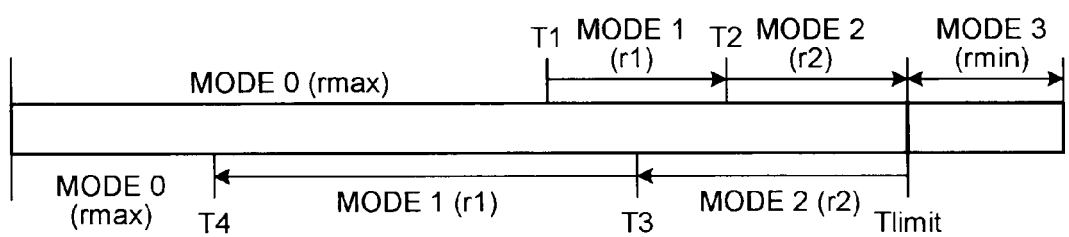
FIG. 3 is a diagram illustrating a relation between the number of use blocks and the transmission rate in the embodiment of the invention.

FIG. 3 is a diagram illustrating a relation between the number of use blocks and the transmission rate in the embodiment of the invention. In FIG. 3, as comes close to a right direction of a plane of paper, the number of use blocks increases and the number of empty blocks decreases. As illustrated in FIG. 3, the transmission rate may take rmax, r1, r2, and rmin. In this case, rmax indicates the transmission rate in a state in which the transmission rate is not limited at all, rmin indicates the transmission rate that is determined on the basis of worst response time, and a relation of rmax>r1>r2>rmin exists between the transmission rates. The transmission rate that is used to transmit data among the transmission rates rmax, r1, r2, and rmin is determined on the basis of the comparison result of the number of use blocks and a predetermined threshold value. If modes where the transmission rates of rmax, r1, r2, and rmin are determined are set to a mode 0, a mode 1, a mode 2, and a mode 3, a transition from the mode 0 to the mode 1, a transition from the mode 1 to the mode 2, and a transition from the mode 2 to the mode 3 are determined on the basis of the comparison results of the number of use blocks and threshold values T1, T2, and Tlimit. In addition, a transition from the mode 3 to the mode 2, a transition from the mode 2 to the mode 1, and a transition from the mode 1 to the mode 0 are determined on the basis of the comparison results of the number of use blocks and the threshold values Tlimit, T3, and T4. A relation between the threshold values is set to T4<T1<T3<T2<Tlimit. As such, the reason why a hysteretic characteristic is set to the threshold values to determine the transition of the modes is to prevent the mode from being frequently switched by the transition of the number of use blocks near the threshold values. However, the hysteretic characteristic may not be set to the threshold values.

Figure 4:
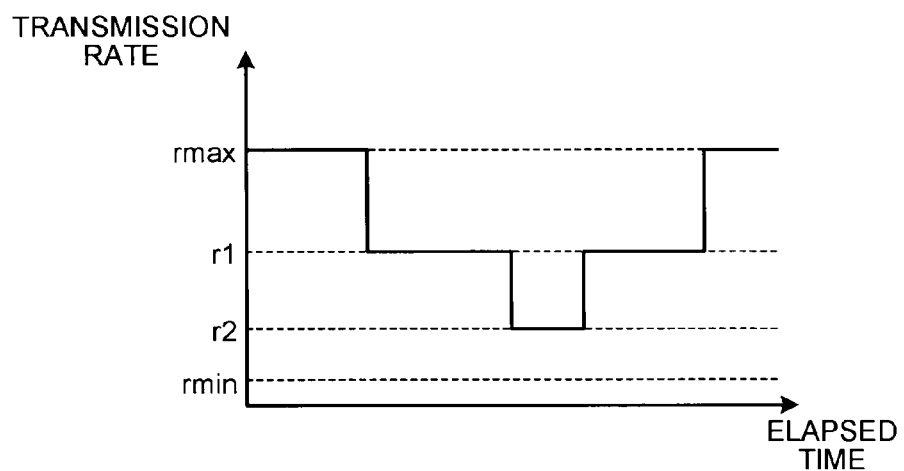
FIG. 4 is a diagram illustrating a transition of the transmission rate of the SSD.

FIG. 4 is a diagram illustrating the transition of the transmission rate of the SSD 1 in the case in which the transmission rate is determined using the relation illustrated in FIG. 3. As illustrated in FIG. 4, according to the SSD 1, the transmission rate does not decrease to rmin from the beginning, when the garbage collection starts. As the number of use blocks increases, the transmission rate decreases in stepwise to r1 and r2, and as the number of use blocks decreases, the transmission rate increases in stepwise to r1 and rmax.

As such, according to the embodiment of the invention, a setting value of the transmission rate is determined on the basis of a balance of the generation speed of the empty block by the garbage collection and the consumption speed of the empty block by data writing. Therefore, generation of the situation where reception of the command from the host device 2 is in standby can be prevented more securely as compared with the case in which a process related to transmission with the host device 2 is stopped until the garbage collection is completed.

Returning to FIG. 1, in the memory cell array 51, a system area 52 where various information related to control of the SSD 1 is stored and a user area 53 where writing data from the host device 2 is stored are secured.

The control unit 10 executes control of the whole operation of the SSD 1. Specifically, the control unit 10 includes a resource managing unit 11, the transmission rate setting unit 12, a transmission control unit 13, an address translation table 14, and a mode storage unit 15.

As described above, the address translation table 14 is a table where correspondence relations of the logical addresses and the physical addresses are described. The address translation table 14 is stored by a storage device such as a DRAM or a static random access memory (SRAM).

The transmission rate setting unit 12 calculates the setting value of the transmission rate using the number of use blocks in the user area 53 and the threshold values illustrated in FIG. 3. As illustrated in FIG. 3, since the hysteretic characteristic is set to the threshold values, the transmission rate setting unit 12 stores the modes in the mode storage unit 15, calculates a current mode on the basis of the modes stored by the mode storage unit and the threshold values, updates storage contents of the mode storage unit 15 with the calculated current mode, and calculates the setting value of the transmission rate that corresponds to the calculated current mode. The mode storage unit 15 may be held in a small memory or a register and may be held in the storage device that stores the address translation table 14.

The transmission control unit 13 controls the host I/F 20 and the NAND I/F 40 and controls the data transmission between the host device 2 and the NAND memory 50. When the write data is received from the host device 2, the transmission control unit 13 calculates the waiting time on the basis of the setting value of the transmission rate calculated by the transmission rate setting unit 12 and a size of the write data, inserts waiting period for the calculated waiting time into period of the data transmission between the host I/F 20 and the host device 2, and limits the transmission rate of the write data from the host device 2 to the setting value of the transmission rate. This is to make the transmission rate of the data constant without depending on the size of the write data.

When the transmission control unit 13 receives a flash command from the host device 2 or timing when data overflow is generated in the write cache area 31, the transmission control unit 13 moves the write data cached in the write cache area 31 to the NAND memory 50. The write data of the moving object is written in the user area 53 that is secured in the memory cell array 51. The transmission control unit 13 transmits a notification indicating completion of execution of the received flash command to the host device 2 through the host I/F 20. In this case, the transmission control unit 13 calculates the waiting time on the basis of the setting value of the transmission rate calculated by the transmission rate setting unit 12 and the size of the data of the moving object and transmits the notification (execution completion notification) indicating the completion of the execution of the flash command to the host device 2, after the calculated waiting time passes from the reception of the flash command. That is, the transmission rate setting unit 12 transmits the execution completion notification of the flash command to the host device 2 after a while, when the execution of the flash command is completed.

When the calculated waiting time is shorter than time needed to execute the flash command, the transmission control unit 13 may transmit the execution completion notification after the execution of the flash command is actually completed or may transmit the execution completion notification to the host device 2 after the calculated waiting time passes. In order to prevent the execution of the flash command from being waited until the garbage collection is completed, due to exhaustion of the empty blocks at the time of executing the flash command, a special area (area for urgent movement) that has the same size as that of the write cache area 31 may be secured in the memory cell array 51.

For example, when the calculated waiting time is beyond the worst response time, the transmission control unit 13 copies the data in the write cache area 31 into the area for the urgent movement as it is. When the worst response time passes, the transmission control unit 13 transmits the execution completion notification. If the area for the urgent movement is used once, a next urgent situation cannot be resolved. For this reason, a process of temporarily making the current mode transit to the mode 3, securing the area for the urgent movement, and returning the mode to the original mode is preferably executed. Thereby, since data does not exist in the write cache, a situation using the area for the urgent movement can be suppressed. Instead of specially providing the area for the urgent movement, areas of the number that is obtained by subtracting Tlimit from the total number of blocks may be used as areas for the urgent movement.

When the transmission control unit 13 executes the data transmission from the write cache area 31 to the NAND memory 50, the transmission control unit 13 registers a correspondence relation between the LBA of the write data of the moving object and the physical address of the memory cell array 51 in the address translation table 14.

The resource managing unit 11 may execute the garbage collection while the write data from the host device 2 is transmitted to the write cache area 31 or while the flash command is not executed during a period until the execution completion notification is transmitted after the flash command is received.

The resource managing unit 11 has a function of taking a snapshot to store the address translation table 14 in the non-volatile NAND memory 50. The snapshot 54 is a copy of the address translation table 14 that is stored in the NAND memory 50, and storing the address translation table 14 included by the control unit 10 in the system area 52 in the NAND memory 50 is expressed as taking the snapshot.

A log 55 is differential information of the address translation table 14. In a case in which the snapshot is taken whenever the address translation table 14 is updated, because the number of times of writing with respect to the NAND memory 50 increases, only the log 55 that functions as the differential information is generally recorded in the system area 52. Since a size capable of storing the log 55 is finite, the resource managing unit 11 executes a process of including the logs 55 in the address translation table 14, taking the snapshot, and deleting the accumulated logs 55, when the logs 55 of the predetermined amount are accumulated. In the generated snapshot 54, the accumulated logs 55 are included. The log 55 may be stored in the storage device to store the address translation table 14, not the NAND memory 50.

Figure 5:
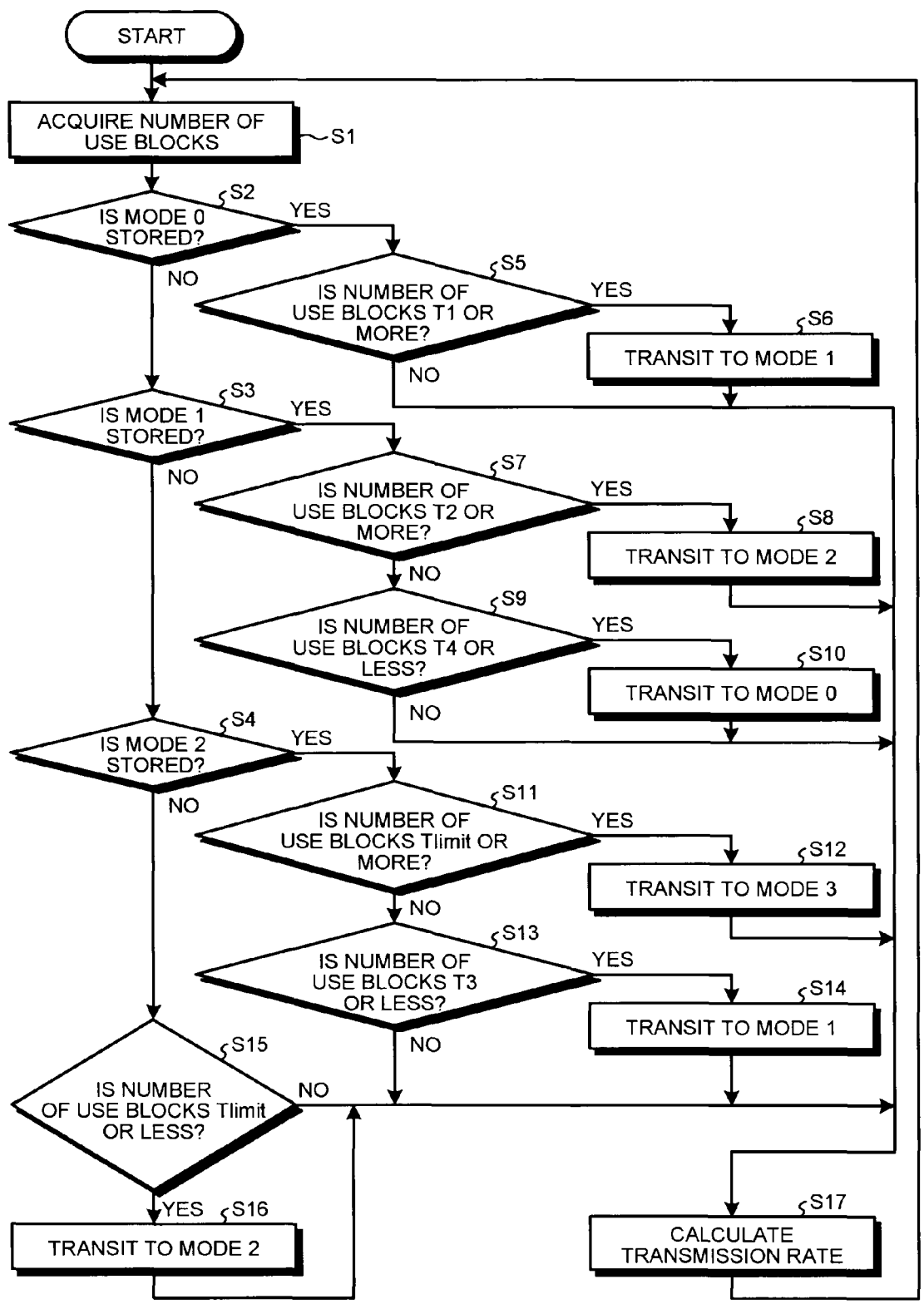
FIG. 5 is a flowchart illustrating an operation of the transmission rate setting unit.

Next, an operation of the SSD according to the embodiment of the invention will be described. FIG. 5 is a flowchart illustrating an operation of the transmission rate setting unit 12.

As illustrated in FIG. 5, first, the transmission rate setting unit 12 acquires the number of use blocks in the user area 53 (step S1). The number of use blocks in the user area 53 can be calculated on the basis of the address translation table 14 for example.

The transmission rate setting unit 12 determines whether the mode stored by the mode storage unit 15 is the mode 0 (step S2), the mode 1 (step S3), or the mode 2 (step S4).

When the mode 0 is stored in the mode storage unit 15 (Yes in step S2), the transmission rate setting unit 12 determines whether the acquired number of use blocks is the threshold value T1 or more (step S5). When the number of use blocks is the threshold value T1 or more (Yes in step S5), the transmission rate setting unit 12 overwrites the value stored by the mode storage unit 15 with the mode 1 (step S6). The transmission rate setting unit 12 uses the transmission rate according to the mode stored by the mode storage unit 15 as a setting value (step S17). The setting value of the transmission rate is notified to the transmission control unit 13. If the process of step S17 is completed, the process proceeds to step S1. When the acquired number of use blocks is not the threshold value T1 or more (No in step S5), step S6 is skipped and the process proceeds to step S17.

When the mode 1 is stored in the mode storage unit 15 (Yes in step S3), the transmission rate setting unit 12 determines whether the acquired number of use blocks is the threshold value T2 or more (step S7). When the number of use blocks is the threshold value T2 or more (Yes in step S7), the transmission rate setting unit 12 overwrites the value stored by the mode storage unit 15 with the mode 2 (step S8) and the process proceeds to step S17. When the acquired number of use blocks is not the threshold value T2 or more (No in step S7), the transmission rate setting unit 12 determines whether the acquired number of use blocks is the threshold value T4 or less (step S9). When the number of use blocks is the threshold value T4 or less (Yes in step S9), the transmission rate setting unit 12 overwrites the value stored by the mode storage unit 15 with the mode 0 (step S10) and the process proceeds to step S17. When the number of use blocks is not the threshold value T4 or less (No in step S9), step S10 is skipped and the process proceeds to step S17.

When the mode 2 is stored in the mode storage unit 15 (Yes in step S4), the transmission rate setting unit 12 determines whether the acquired number of use blocks is the threshold value Tlimit or more (step S11). When the number of use blocks is the threshold value Tlimit or more (Yes in step S11), the transmission rate setting unit 12 overwrites the value stored by the mode storage unit 15 with the mode 3 (step S12) and the process proceeds to step S17. When the acquired number of use blocks is not the threshold value Tlimit or more (No in step S11), the transmission rate setting unit 12 determines whether the acquired number of use blocks is the threshold value T3 or less (step S13). When the number of use blocks is the threshold value T3 or less (Yes in step S13), the transmission rate setting unit 12 overwrites the value stored by the mode storage unit 15 with the mode 1 (step S14) and the process proceeds to step S17. When the number of use blocks is not the threshold value T3 or less (No in step S13), step S14 is skipped and the process proceeds to step S17.

When the mode stored in the mode storage unit 15 is not the modes 0 to 2 (No in step S2, No in step S3, and No in step S4), the mode 3 is stored in the mode storage unit 15. In this case, the transmission rate setting unit 12 determines whether the acquired number of use blocks is the threshold value Tlimit or less (step S15). When the number of use blocks is the threshold value Tlimit or less (Yes in step S15), the transmission rate setting unit 12 overwrites the value stored by the mode storage unit 15 with the mode (step S16) and the process proceeds to step S17. When the number of use blocks is not the threshold value Tlimit or less (No in step S15), step S16 is skipped and the process proceeds to step S17.

Figure 6:
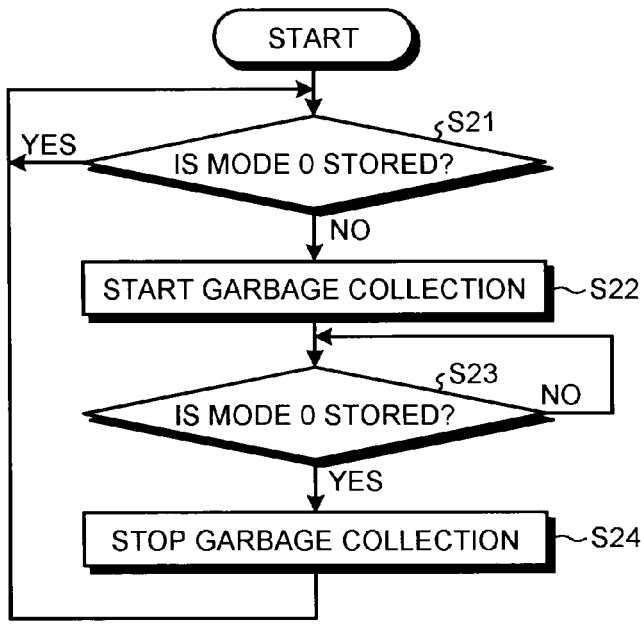
FIG. 6 is a flowchart illustrating an operation of executing/stopping the garbage collection by a resource managing unit.

FIG. 6 is a flowchart illustrating an operation of executing/stopping the garbage collection by the resource managing unit 11. As illustrated in FIG. 6, first, the resource managing unit 11 determines whether the mode storage unit 15 stores the mode 0 (step S21). When the mode storage unit 15 does not store the mode 0 (No in step S21), the resource managing unit 11 starts the garbage collection (step S22). When the mode storage unit 15 stores the mode 0 (Yes in step S21), the resource managing unit 11 continuously executes the determination process of step S21 until the storage content of the mode storage unit 15 becomes the modes other than the mode 0.

The resource managing unit 11 determines whether the mode storage unit 15 stores the mode 0 again, after the garbage collection starts (step S23). When the mode storage unit 15 stores the mode 0 (Yes in step S23), the resource managing unit 11 stops the garbage collection (step S24) and executes the determination process of step S21. In step S23, when the mode storage unit 15 does not store the mode 0 (No in step S23), the resource managing unit 11 continuously executes the determination process of step S23 until the storage content of the mode storage unit 15 becomes the mode 0.

Figure 7:
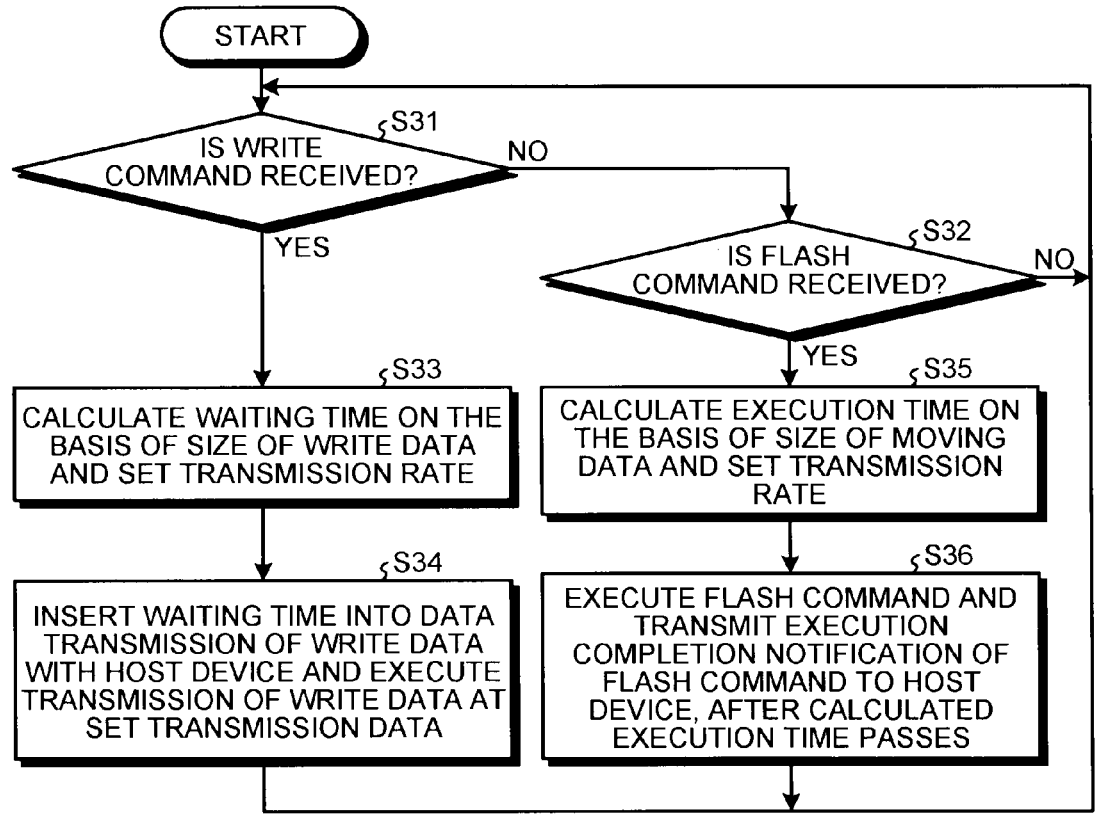
FIG. 7 is a flowchart illustrating an operation of a transmission control unit.

FIG. 7 is a flowchart illustrating an operation of the transmission control unit 13. As illustrated in FIG. 7, first, the transmission control unit 13 determines whether the write command is received (step S31). When the write command is not received (No in step S31), the transmission control unit 13 determines whether the flash command is received (step S32). When the flash command is not received (No in step S32), the transmission control unit 13 executes the determination process of step S31.

In step S31, when it is determined that the write command is received (Yes in step S31), the transmission control unit 13 calculates the waiting time on the basis of the size of the write requested data by the write command and the setting value of the transmission rate calculated by the transmission rate setting unit 12 (step S33). Specifically, the transmission control unit 13 calculates the waiting time on the basis of the following Equation 1.

$$\text{Size}/(\text{execution time} + \text{waiting time}) = \text{setting value of transmission rate} \qquad [\text{Equation 1}]$$

In Equation 1, the execution time indicates execution time when the write requested data is transmitted at the transmission rate rmax. The waiting time may be calculated by setting the execution time to zero. In this case, the waiting time that is longer than needed time is inserted into the period of the data transmission and the garbage collection amount changes. However, since the amount of garbage collection objects does not change, the mode can be returned to the mode 0 at approximately the same time.

After step S33, the transmission control unit 13 inserts waiting period for the waiting time calculated in step S33 into period of the data transmission of the write requested data and executes the data transmission of the write requested data according to the setting value of the transmission rate (step S34). If the data transmission of step S34 is completed, the transmission control unit 13 executes the determination process of step S31.

In step S32, when it is determined that the flash command is received (Yes in step S32), the transmission control unit 13 calculates the waiting time on the basis of the size of the data of the moving object cached in the write cache area 31 and the setting value of the transmission rate calculated by the transmission rate setting unit 12 (step S35). Specifically, the transmission control unit 13 calculates the waiting time on the basis of the following Equation 2.

$$\text{Size}/\text{waiting time} = \text{setting value of transmission rate} \qquad [\text{Equation 2}]$$

After step S35, the transmission control unit 13 executes the flash command and transmits the notification indicating the completion of the execution of the flash command to the host device 2, after the waiting time calculated in step S35 passes from the reception of the flash command (step S36). The transmission control unit 13 executes the determination process of step S31.

In the above description, the setting value of the transmission rate is calculated on the basis of the comparison result of the number of use blocks and the predetermined threshold value. However, the same operation and effect can be realized by comparing the number of empty blocks and the threshold values. The amount of resources other than the number of use blocks may be used to calculate the setting value of the transmission rate. Examples of the amount of resources that can be used include an available size of the system area 52. The available size of the system area 52 decreases when the amount of logs 55 increases. When the available size of the system area 52 reaches the predetermined amount, the resource managing unit 11 may include the log 55 in the snapshot 54, erase the included log 55, and manage the available size of the system area 52.

As such, according to the embodiment of the invention, the memory system includes the resource managing unit 11 that reclaims the resources related to the NAND memory 50 and increases the resources, when the usage of the resources related to the NAND memory 50 reaches the predetermined amount, the transmission rate setting unit 12 that calculates the setting value of the transmission rate related to reception of the write data from the host device 2, and the transmission control unit 13 that receives the write data from the host device 2 and transmits the received write data to the NAND memory 50. The transmission rate setting unit 12 calculates the setting value that decreases when the usage of the resources of the NAND memory 50 increases. The transmission control unit 13 executes reception of the write data from the host device 2 at the transmission rate of the setting value calculated by the transmission rate setting unit 12, while the resource managing unit 11 reclaims the resources. Therefore, the response time with respect to the write command can be prevented from excessively increasing, as compared with the case in which the execution of the command stands by until the reclaiming of the resources ends.

The transmission control unit 13 calculates the waiting time on the basis of the size of the data of the moving object cached in the write cache area 31 and the setting value of the transmission rate, when the flash command is received, and transmits the execution completion notification with respect to the received flush request to the host device 2, after the calculated waiting time passes from the reception of the flash command. Therefore, even when the flash command is received, the garbage collection can be executed. Thus, the empty blocks can be suppressed from being exhausted, when the write command is received after the execution of the flash command is completed. As a result, the response time with respect to the write command can be prevented from excessively increasing.

The transmission rate setting unit 12 may change the threshold value used to calculate the setting value of the transmission rate and/or the value of the transmission rate, according to the command reception interval time. In other words, the transmission rate setting unit 12 may change the threshold value and/or the value of the transmission rate according to an access frequency from the host device 2. The transmission rate setting unit 12 may decrease the threshold value when the access frequency from the host device 2 is lower than a predetermined interval and may increase the threshold value when the access frequency from the host device 2 is higher than the predetermined interval.

FIG. 8 is a diagram illustrating the transmission rate and the threshold value in the case in which the transmission rate and the threshold value are changed according to the command reception interval time. As illustrated in FIG. 8, when the command reception interval time is longer than tth, r1a is used as r1, r2a is used as r2, T1a is used as T1, T2a is used as T2, T3a is used as T3, and Tlimita is used as Tlimit.

When the command reception interval time is shorter than tth, r1b is used as r1, r2b is used as r2, T1b is used as T1, T2b is used as T2, T3b is used as T3, and Tlimitb is used as Tlimit. However, a relation of rmax>r1a>r2a>rmin, T4a<T1a<T3a<T2a<Tlimita, rmax>r1b>r2b>rmin, T4b<T1b<T3b<T2b21 Tlimitb, r1b<r1a, r2b<r2a, T1b<T1a, T2b<T2a, T3b<T3a, T4b<T4a, and Tlimitb<Tlimita is maintained.

The transmission rate setting unit 12 determines a relation between each mode and the transmission rate and the threshold value by the operation illustrated in the flowchart of FIG. 9. That is, in step S41, the transmission rate setting unit 12 determines whether the command reception interval time is longer than tth (step S41).

When the command reception interval time is shorter than tth (No in step S41), the transmission rate setting unit 12 sets the transmission rates in the modes 0, 1, 2, and 3 to rmax, r1a, r2a, and rmin, respectively, using T1a, T2a, T3a, and Tlimita as the threshold values to determine the modes (step S42).

When the command reception interval time is longer than tth (Yes in step S41), the transmission rate setting unit 12 sets the transmission rates in the modes 0, 1, 2, and 3 to rmax, r1b, r2b, and rmin, respectively, using T1b, T2b, T3b, and Tlimitb as the threshold values to determine the modes (step S43).

After step S42 or S43, the process proceeds to step S41. The command reception interval time may be elapsed time from the previously received command at the time of receiving the command or an average value of command reception intervals obtained by recording the command reception interval many times.

As such, when the command reception interval is long, the possibility of execution of a next command being in standby decreases, even though the response time increases in the host device 2. Therefore, the SSD 1 can increase time allocated to the garbage collection by delaying the transmission rate. As a result, the garbage collection can be completed fast. When the command reception interval is short, the fast response time is required in the host device 2. Therefore, the SSD 1 can increase the transmission rate by decreasing the time allocated to the garbage collection.

When the command reception interval is long, empty blocks of the large amount can be secured in preparation for the case in which the command reception interval becomes short, by decreasing the threshold value (in particular, T4). Thereby, the opportunities of limiting the transmission rate when the command reception interval becomes short can be decreased.

In the first embodiment, the user area that is secured in the NAND memory is regarded as the resource to determine the transmission rate. However, in a second embodiment, the system area 52 is regarded as the resource.

Figure 10:
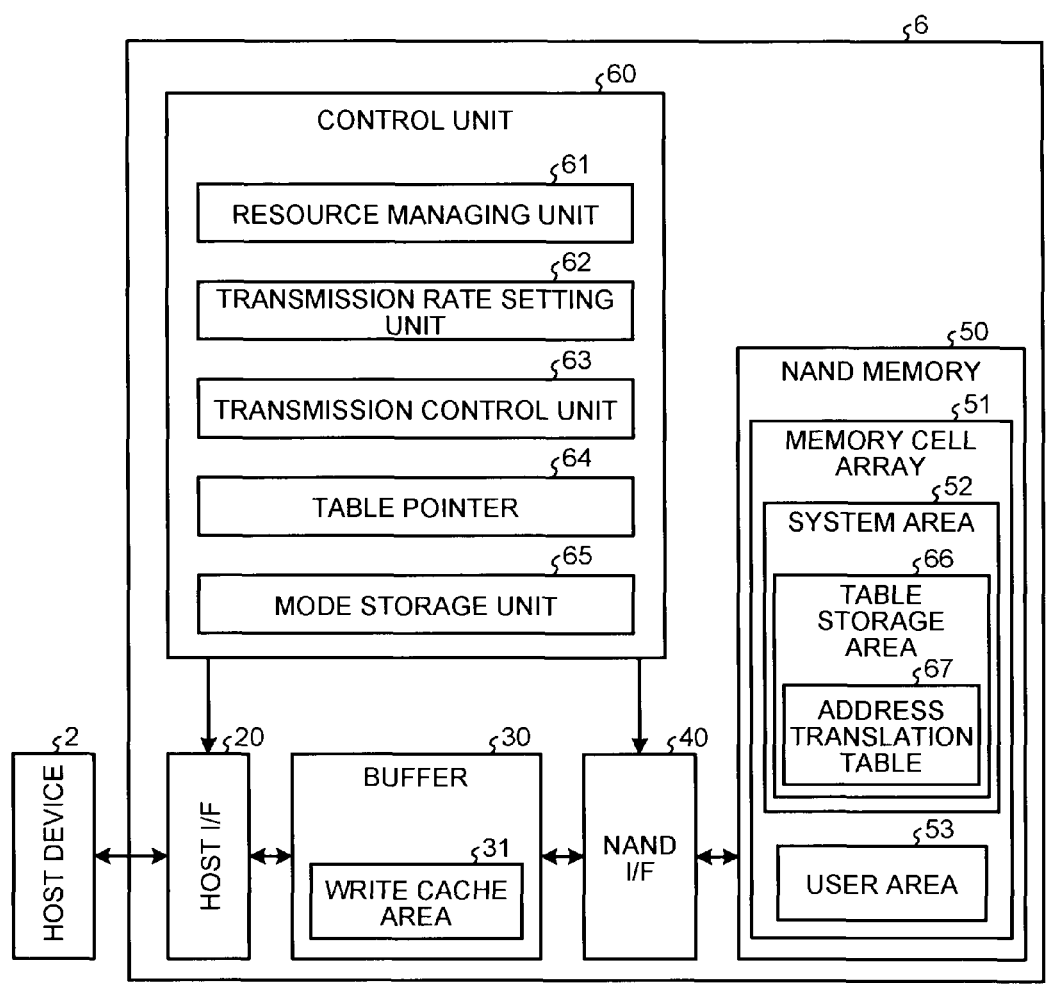
FIG. 10 is a block diagram illustrating the configuration of an SSD according to a second embodiment.

FIG. 10 is a block diagram illustrating the configuration of an SSD according to a second embodiment of the invention. In the second embodiment, the same components as those of the first embodiment are denoted by the same reference numerals and the redundant description will not be repeated.

As illustrated in FIG. 10, an SSD 6 includes a control unit 60, a host interface (I/F) 20, a buffer 30, a NAND I/F 40, and a NAND memory 50.

The NAND memory 50 includes a memory cell array 51 that is configured using a NAND-type non-volatile storage element. In the memory cell array 51, a system area 52 and a user area 53 are secured. According to the second embodiment, a table storage area 66 where an address translation table 67 is stored is secured in the system area 52. The address translation table 67 is a table where a correspondence relation between logical addresses and physical addresses related to data stored in the user area 53 is described. The table storage area 66 includes plural blocks.

FIG. 11 is a diagram illustrating an example of the data configuration of the address translation table 67. As illustrated in FIG. 11, according to the address translation table 67, plural entries each having a pair of the physical address and the logical address are registered. In the address translation table 67, the entries are registered such that the logical addresses are continuous.

According to the second embodiment of the invention, since the address translation table 67 is placed on the NAND memory 50, contents of the address translation table 67 are updated by recording. That is, when the address translation table 67 is updated, a new content of an update portion is recorded in a page of an empty block where writing is not yet executed. The address translation table 67 is divided into plural tables (an update unit table a, an update unit table b, and the like) for each size becoming an update unit. In the size of the update unit, for example, a page size or the natural number multiple of the page size is adopted. The size of the update unit may be determined such that the number of entries for each update unit table becomes the predetermined number (for example, power of two).

Figure 12A:
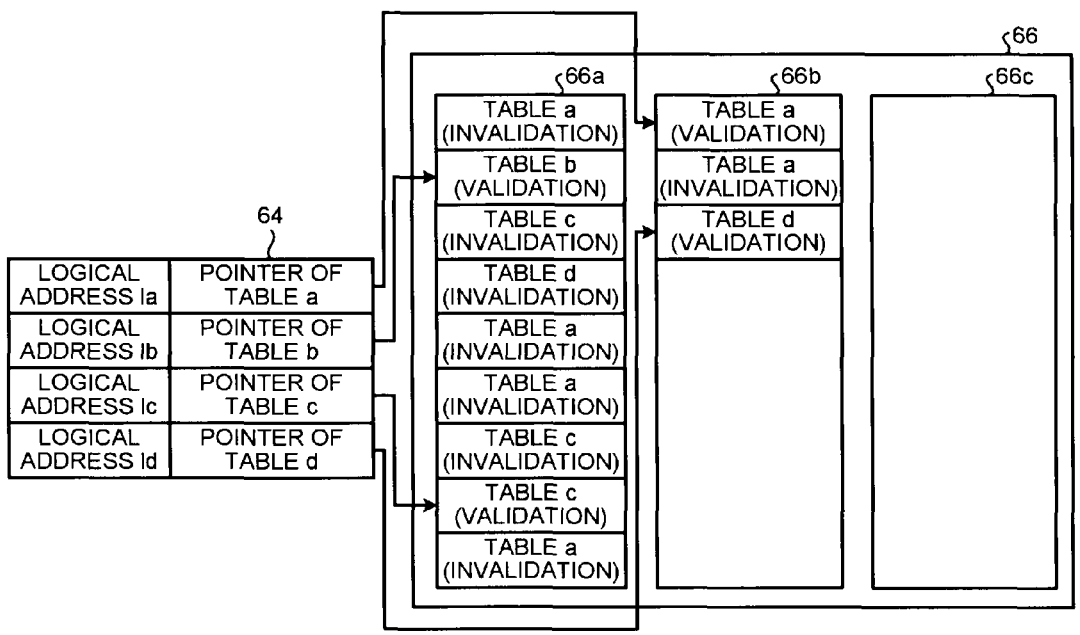
FIG. 12A is a diagram illustrating a concept of a garbage collection in a table storage area.
Figure 12B:
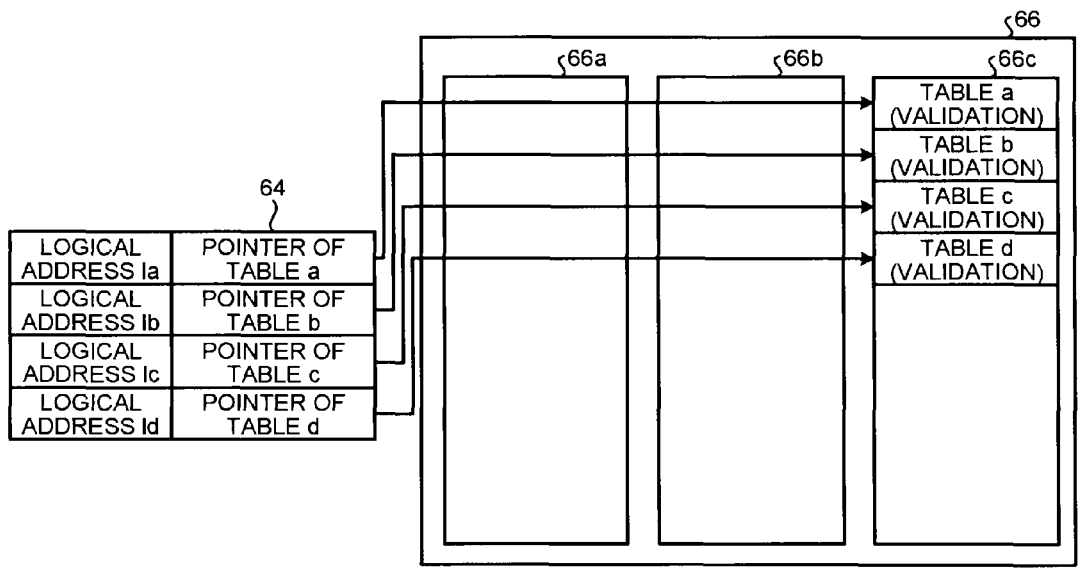
FIG. 12B is a diagram illustrating a concept of a garbage collection in the table storage area.

When the address translation table 67 is updated, the update unit tables that become invalidated by recording increase and available areas decrease. Therefore, the garbage collection is executed with respect to the table storage area 66. FIGS. 12A and 12B are diagrams illustrating a concept of the garbage collection in the table storage area 66.

FIG. 12A illustrates a state of the table storage area 66 before the garbage collection. In this case, by way of example, the table storage area 66 includes three blocks 66a to 66c and the address translation table 67 is divided into four update unit tables a to d. As illustrated in FIG. 12A, contents of the update unit tables a to d are held using the blocks 66a and 66b among the blocks 66a to 66c. Among the storage contents of the table storage area 66, contents of the eight update unit tables are invalidated. The valid update unit table b and the valid update unit table c are stored in the block 66a and the valid update unit table a and the valid update unit table d are stored in the block 66b.

The storage positions of the valid contents of the update unit tables a to d can be specified by pointers included in a table pointer 64. In an example of FIG. 12A, each of the pointers that is included in the table pointer 64 is associated with a logical address that is used as an index to search the pointer. The logical address that is used as the index is equal to the logical address included in the head entry among the entries included in the corresponding update unit table. An upper bit string that is common to each of the logical addresses included in the entries constituting the update unit table may be registered as the index in the table pointer 64.

FIG. 12B illustrates a state of the table storage area 66 after the garbage collection. As illustrated in FIG. 12B, after the garbage collection, the valid update unit table b and the valid update unit table c that are stored in the block 66a and the valid update unit table a and the valid update unit table d that are stored in the block 66b are copied into the block 66c and the storage contents of the blocks 66a and 66b are erased. According to the copying of the valid update unit table, the contents of the pointers that are included in the table pointer 64 are updated. By executing the garbage collection, the contents of the invalid update unit table are erased and the available storage capacity becomes larger than the available storage capacity before the garbage collection is executed.

Returning to FIG. 10, the control unit 60 includes a resource managing unit 61, the transmission rate setting unit 62, a transmission control unit 63, a table pointer 64, and a mode storage unit 65.

As described above, the table pointer 64 is a table that includes a list of pointers showing the storage positions for every update unit table and is stored by a volatile storage device such as a DRAM or a static random access memory (SRAM).

The transmission rate setting unit 62 calculates a setting value of the transmission rate with the host device 2, on the basis of the number of use blocks of the table storage area 66.

Figure 13:
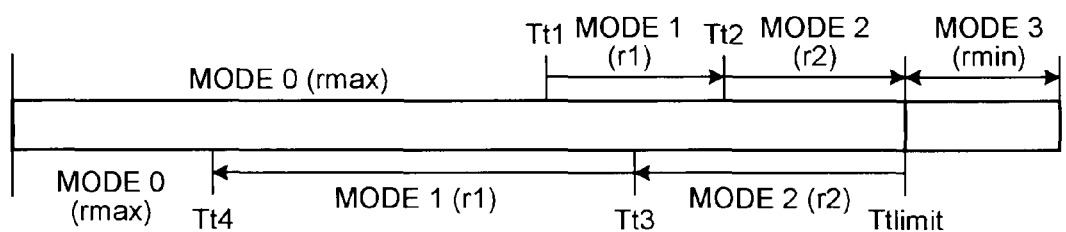
FIG. 13 is a diagram illustrating a relation between the number of use blocks of the table storage area and the transmission rate in the second embodiment.

FIG. 13 is a diagram illustrating a relation between the number of use blocks and the transmission rate of the table storage area 66 in the second embodiment. In FIG. 13, as comes close to a right direction of a plane of paper, the number of use blocks increases and the number of empty blocks decreases. As illustrated in FIG. 13, the transmission rate may take rmax, r1, r2, and rmin. In this case, rmax indicates the transmission rate in a state in which the transmission rate is not limited at all, rmin indicates the transmission rate that is determined on the basis of worst response time, and a relation of rmax>r1>r2>rmin exists between the transmission rates. The transmission rate setting unit 62 determines the transmission rate that is used to transmit data among the transmission rates rmax, r1, r2, and rmin, on the basis of the comparison result of the number of use blocks and a predetermined threshold value. If modes where the transmission rates of rmax, r1, r2, and rmin are determined are set to a mode 0, a mode 1, a mode 2, and a mode 3, a transition from the mode 0 to the mode 1, a transition from the mode 1 to the mode 2, and a transition from the mode 2 to the mode 3 are determined on the basis of the comparison results of the number of use blocks of the table storage area 66 and threshold values Tt1, Tt2, and Ttlimit. In addition, a transition from the mode 3 to the mode 2, a transition from the mode 2 to the mode 1, and a transition from the mode 1 to the mode 0 are determined on the basis of the comparison results of the number of use blocks and threshold values Ttlimit, Tt3, and Tt4. A relation between the threshold values is set to Tt4<Tt1<Tt3<Tt2<Ttlimit. As such, the reason why a hysteretic characteristic is set to the threshold values to determine the transition of the modes is to prevent the mode from being frequently switched by the transition of the number of use blocks near the threshold values. However, the hysteretic characteristic may not be set to the threshold values.

The mode storage unit 65 stores values of the modes that are used by the transmission rate setting unit 62 at the time of calculating the transmission rate. The mode storage unit 65 may be held in a small memory or a register.

The resource managing unit 61 executes the garbage collection of the table storage area 66.

Figure 14:
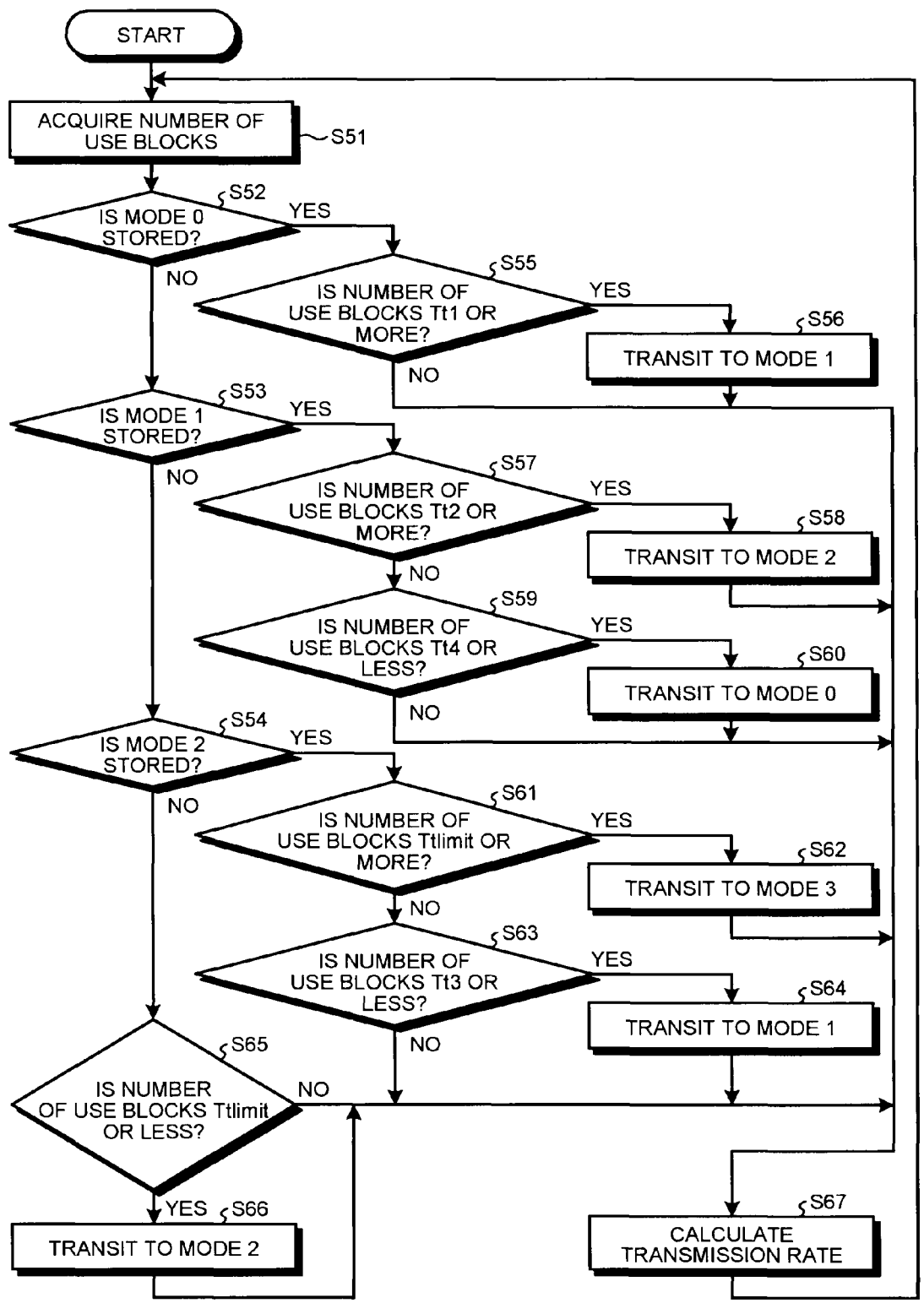
FIG. 14 is a flowchart illustrating an operation of the transmission rate setting unit.

Next, an operation of the SSD according to the second embodiment of the invention will be described. FIG. 14 is a flowchart illustrating an operation of the transmission rate setting unit 62.

As illustrated in FIG. 14, first, the transmission rate setting unit 62 acquires the number of use blocks in the table storage area 66 (step S51). The number of use blocks in the user area 53 can be calculated on the basis of the address translation table 67.

The transmission rate setting unit 62 determines whether the mode stored by the mode storage unit 65 is the mode 0 (step S52), the mode 1 (step S53), or the mode 2 (step S54).

When the mode 0 is stored in the mode storage unit 65 (Yes in step S52), the transmission rate setting unit 62 determines whether the acquired number of use blocks is the threshold value Tt1 or more (step S55). When the number of use blocks is the threshold value Tt1 or more (Yes in step S55), the transmission rate setting unit 62 overwrites the value stored by the mode storage unit 65 with the mode 1 (step S56). The transmission rate setting unit 62 uses the transmission rate according to the mode stored by the mode storage unit 65 as a setting value (step S67). The setting value of the transmission rate is notified to the transmission control unit 63. If the process of step S67 is completed, the process proceeds to step S51. When the acquired number of use blocks is not the threshold value Tt1 or more (No in step S55), step S56 is skipped and the process proceeds to step S67.

When the mode 1 is stored in the mode storage unit 65 (Yes in step S53), the transmission rate setting unit 62 determines whether the acquired number of use blocks is the threshold value Tt2 or more (step S57). When the number of use blocks is the threshold value Tt2 or more (Yes in step S57), the transmission rate setting unit 62 overwrites the value stored by the mode storage unit 65 with the mode 2 (step S58) and the process proceeds to step S67. When the acquired number of use blocks is not the threshold value Tt2 or more (No in step S57), the transmission rate setting unit 62 determines whether the acquired number of use blocks is the threshold value Tt4 or less (step S59). When the number of use blocks is the threshold value Tt4 or less (Yes in step S59), the transmission rate setting unit 62 overwrites the value stored by the mode storage unit 65 with the mode 0 (step S60) and the process proceeds to step S67. When the number of use blocks is not the threshold value Tt4 or less (No in step S59), step S60 is skipped and the process proceeds to step S67.

When the mode 2 is stored in the mode storage unit 65 (Yes in step S54), the transmission rate setting unit 62 determines whether the acquired number of use blocks is the threshold value Ttlimit or more (step S61). When the number of use blocks is the threshold value Ttlimit or more (Yes in step S61), the transmission rate setting unit 62 overwrites the value stored by the mode storage unit 65 with the mode 3 (step S62) and the process proceeds to step S67. When the acquired number of use blocks is not the threshold value Ttlimit or more (No in step S61), the transmission rate setting unit 62 determines whether the acquired number of use blocks is the threshold value Tt3 or less (step S63). When the number of use blocks is the threshold value Tt3 or less (Yes in step S63), the transmission rate setting unit 62 overwrites the value stored by the mode storage unit 65 with the mode 1 (step S64) and the process proceeds to step S67. When the number of use blocks is not the threshold value Tt3 or less (No in step S63), step S64 is skipped and the process proceeds to step S67.

When the mode stored in the mode storage unit 65 is not the modes 0 to 2 (No in step S52, No in step S53, and No in step S54), the mode 3 is stored in the mode storage unit 65. In this case, the transmission rate setting unit 62 determines whether the acquired number of use blocks is the threshold value Ttlimit or less (step S65). When the number of use blocks is the threshold value Ttlimit or less (Yes in step S65), the transmission rate setting unit 62 overwrites the value stored by the mode storage unit 65 with the mode 2 (step S66) and the process proceeds to step S67. When the number of use blocks is not the threshold value Ttlimit or less (No in step S65), step S66 is skipped and the process proceeds to step S67.

Figure 15:
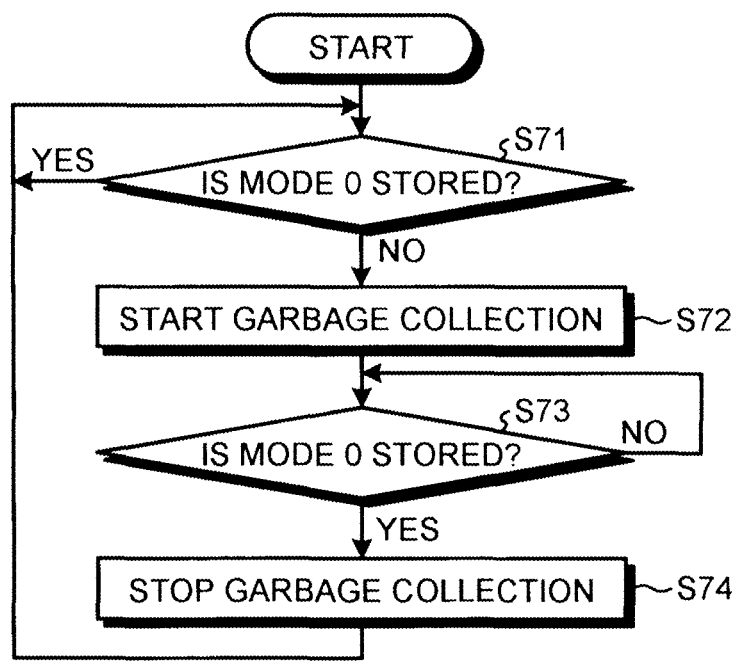
FIG. 15 is a flowchart illustrating an operation of executing/stopping the garbage collection by a resource managing unit.

FIG. 15 is a flowchart illustrating an operation of executing/stopping the garbage collection by the resource managing unit 61. As illustrated in FIG. 15, first, the resource managing unit 61 determines whether the mode storage unit 65 stores the mode 0 (step S71). When the mode storage unit 65 does not store the mode 0 (No in step S71), the resource managing unit 61 starts the garbage collection of the table storage area 66 (step S72). When the mode storage unit 65 stores the mode 0 (Yes in step S71), the resource managing unit 61 continuously executes the determination process of step S71 until the storage content of the mode storage unit 65 becomes the modes other than the mode 0.

The resource managing unit 61 determines whether the mode storage unit 65 stores the mode 0 again, after the garbage collection starts (step S73). When the mode storage unit 65 stores the mode 0 (Yes in step S73), the resource managing unit 61 stops the garbage collection of the table storage area 66 (step S74) and executes the determination process of step S71. In step S73, when the mode storage unit 65 does not store the mode 0 (No in step S73), the resource managing unit 61 continuously executes the determination process of step S73 until the storage content of the mode storage unit 65 becomes the mode 0.

Since the operation of the transmission control unit 63 is the same as that of the first embodiment, the redundant description will not be repeated.

As such, according to the second embodiment of the invention, the area of the table storage area 66 where the address translation table is not written is used as the resource to determine the transmission rate. Therefore, the response time with respect to the write command can be prevented from excessively increasing, as compared with the case in which the execution of the command is in standby until the garbage collection of the table storage area 66 ends.

In the second embodiment, the threshold values and/or the values of the transmission rates that are used to calculate the setting value of the transmission rate may be changed according to the command reception interval.

In the first and second embodiments, the storage area in the NAND memory that functions as the non-volatile memory is regarded as the resource. However, in third and following embodiments, the volatile memory area is regarded as the resource. In the third embodiment, the empty area of the write cache area is used as the resource to determine the transmission rate.

Figure 16:
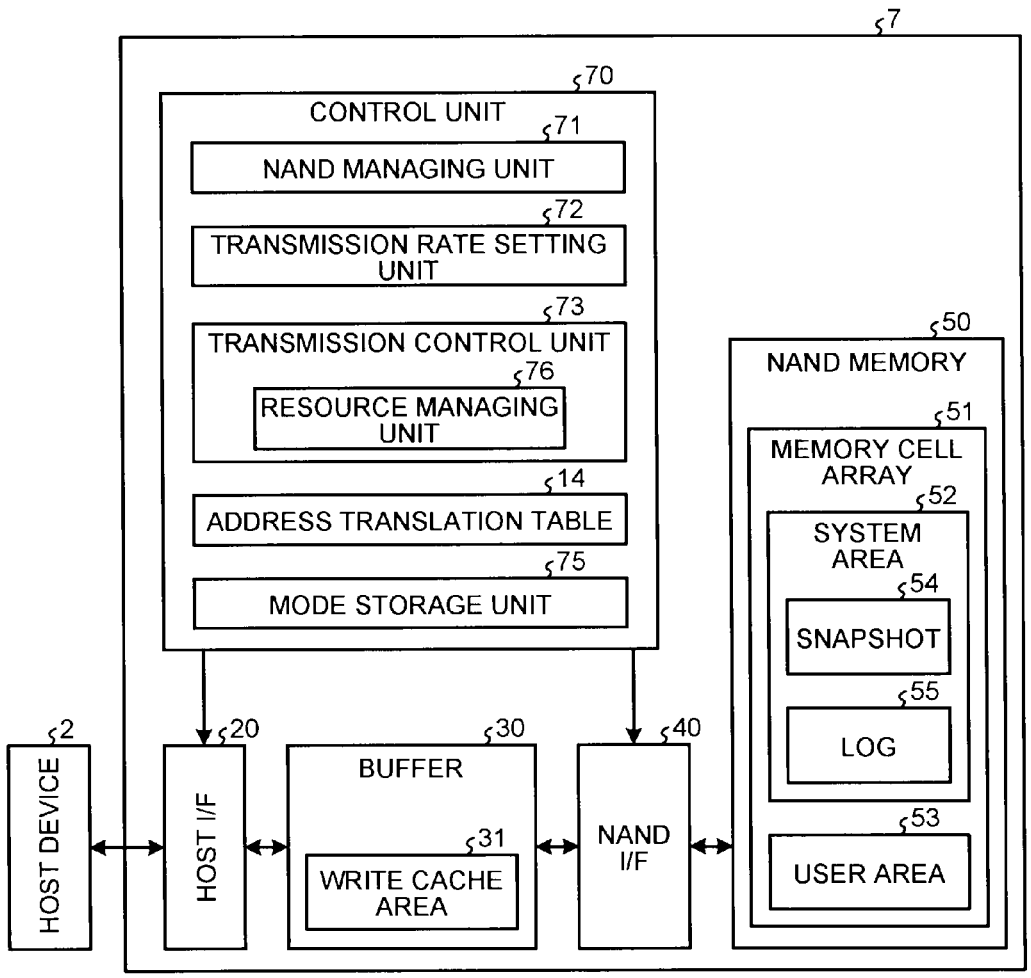
FIG. 16 is a block diagram illustrating the configuration of an SSD according to a third embodiment of the invention.

FIG. 16 is a block diagram illustrating the configuration of an SSD according to the third embodiment of the invention. In the third embodiment, the same components as those of the first embodiment are denoted by the same reference numerals and the redundant description will not be repeated.

As illustrated in FIG. 16, an SSD 7 includes a control unit 70, a host interface (I/F) 20, a buffer 30, a NAND I/F 40, and a NAND memory 50.

The buffer 30 includes a write cache area 31 that caches write data received from the host device 2 through the host I/F 20.

The NAND memory 50 includes a memory cell array 51 that is configured using a NAND-type non-volatile storage element. In the memory cell array 51, a system area 52 where a snapshot 54 and a log 55 of the address translation table 14 are stored and a user area 53 where the write dada from the host device 2 is stored via the write cache area 31 are secured.

The control unit 70 includes a NAND managing unit 71, the transmission rate setting unit 72, a transmission control unit 73, an address translation table 14, and a mode storage unit 75.

The transmission rate setting unit 72 calculates a setting value of the transmission rate using the usage of the write cache area 31 and the predetermined threshold values.

Figure 17:
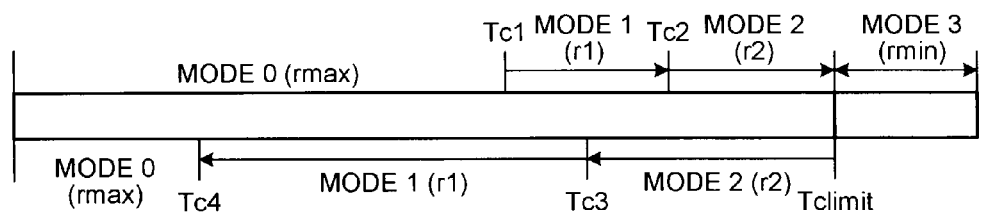
FIG. 17 is a diagram illustrating a relation between a use rate of a write cache area and the transmission rate.

FIG. 17 is a diagram illustrating a relation between the usage of the write cache area 31 and the transmission rate. In FIG. 17, as comes close to a right direction of a plane of paper, the usage of the write cache area 31 increases and the empty area of the write cache area 31 decreases. As illustrated in FIG. 17, the transmission rate may take rmax, r1, r2, and rmin. In this case, rmax indicates the transmission rate in a state in which the transmission rate is not limited at all, rmin indicates the transmission rate that is determined on the basis of worst response time, and a relation of rmax>r1>r2>rmin exists between the transmission rates. The transmission rate that is used to transmit data among the transmission rates rmax, r1, r2, and rmin is determined, on the basis of the comparison result of the usage of the write cache area 31 and a predetermined threshold value. If modes where the transmission rates of rmax, r1, r2, and rmin are determined are set to a mode 0, a mode 1, a mode 2, and a mode 3, a transition from the mode 0 to the mode 1, a transition from the mode 1 to the mode 2, and a transition from the mode 2 to the mode 3 are determined on the basis of the comparison results of the usage of the write cache area 31 and threshold values Tc1, Tc2, and Tclimit. In addition, a transition from the mode 3 to the mode 2, a transition from the mode 2 to the mode 1, and a transition from the mode 1 to the mode 0 are determined on the basis of the comparison results of the usage of the write cache area 31 and threshold values Tclimit, Tc3, and Tc4. A relation of the threshold values is set to Tc4<Tc1<Tc3<Tc2<Tclimit. As such, the reason why a hysteretic characteristic is set to the threshold values to determine the transition of the modes is to prevent the mode from being frequently switched by the transition of the usage of the write cache area 31 near the threshold values. However, the hysteretic characteristic may not be set to the threshold values.

In this case, the usage of the write cache area 31 is used to calculate the setting value of the transmission rate. However, instead of the usage of the write cache area 31, the number of lines being used or a use rate may be used.

The mode storage unit 75 stores values of the modes that are used by the transmission rate setting unit 72 at the time of calculating the transmission rate. The mode storage unit 75 may be held in a small memory or a register.

The transmission control unit 73 controls the host I/F 20 and the NAND I/F 40 and controls data transmission between the host device 2 and the write cache area 31. At this time, the data transmission is executed at the transmission rate set by the transmission rate setting unit 72. The transmission control unit 73 includes a resource managing unit 76 that moves the write data cached in the write cache area 31 to the NAND memory 50. The write data of the moving object is written in the user area 53 that is secured in the memory cell array 51.

The NAND managing unit 71 executes an operation of taking the garbage collection of the user area 53, the snapshot 54 of the address translation table 14, and the log 55 of the address translation table 14.

Figure 18:
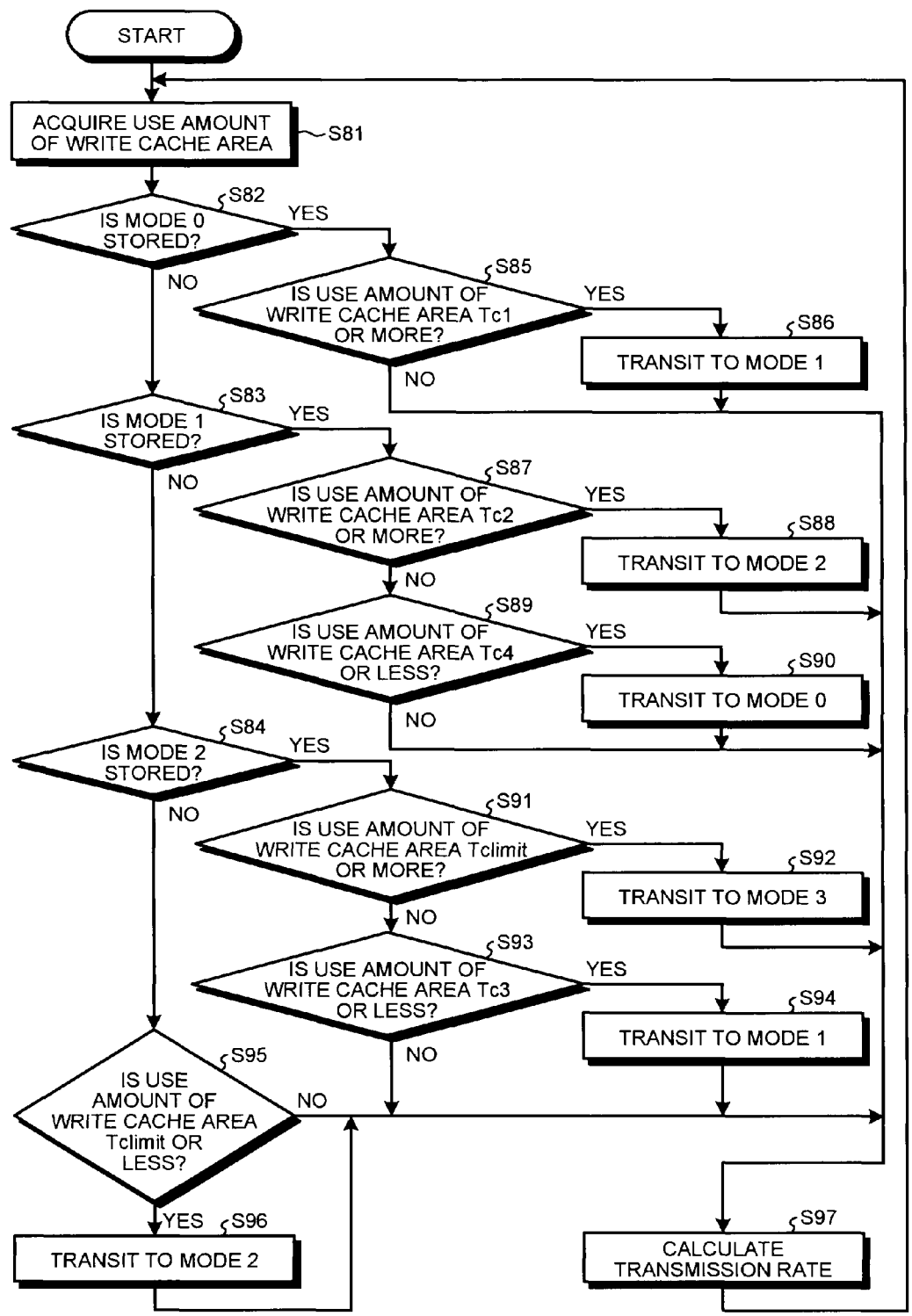
FIG. 18 is a flowchart illustrating an operation of the transmission rate setting unit.

Next, an operation of the SSD according to the third embodiment of the invention will be described. FIG. 18 is a flowchart illustrating an operation of the transmission rate setting unit 72.

As illustrated in FIG. 18, first, the transmission rate setting unit 72 acquires the usage of the write cache area 31 (step S81). The transmission rate setting unit 72 determines whether the mode stored by the mode storage unit 75 is the mode 0 (step S82), the mode 1 (step S83), or the mode 2 (step S84).

When the mode 0 is stored in the mode storage unit 75 (Yes in step S82), the transmission rate setting unit 72 determines whether the acquired usage of the write cache area 31 is the threshold value Tc1 or more (step S85). When the usage of the write cache area 31 is the threshold value Tc1 or more (Yes in step S85), the transmission rate setting unit 72 overwrites the value stored by the mode storage unit 75 with the mode 1 (step S86). The transmission rate setting unit 72 uses the transmission rate according to the mode stored by the mode storage unit 75 as a setting value (step S97). The setting value of the transmission rate is notified to the transmission control unit 73. If the process of step S97 is completed, the process proceeds to step S81. When the acquired usage of the write cache area 31 is not the threshold value Tc1 or more (No in step S85), step S86 is skipped and the process proceeds to step S97.

When the mode 1 is stored in the mode storage unit 75 (Yes in step S83), the transmission rate setting unit 72 determines whether the acquired usage of the write cache area 31 is the threshold value Tc2 or more (step S87). When the usage of the write cache area 31 is the threshold value Tc2 or more (Yes in step S87), the transmission rate setting unit 72 overwrites the value stored by the mode storage unit 75 with the mode 2 (step S88) and the process proceeds to step S97. When the acquired usage of the write cache area 31 is not the threshold value Tc2 or more (No in step S87), the transmission rate setting unit 72 determines whether the acquired usage of the write cache area 31 is the threshold value Tc4 or less (step S89). When the usage of the write cache area 31 is the threshold value Tc4 or less (Yes in step S89), the transmission rate setting unit 72 overwrites the value stored by the mode storage unit 75 with the mode 0 (step S90) and the process proceeds to step S97. When the usage of the write cache area 31 is not the threshold value Tc4 or less (No in step S89), step S90 is skipped and the process proceeds to step S97.

When the mode 2 is stored in the mode storage unit 75 (Yes in step S84), the transmission rate setting unit 72 determines whether the acquired usage of the write cache area 31 is the threshold value Tclimit or more (step S91). When the usage of the write cache area 31 is the threshold value Tclimit or more (Yes in step S91), the transmission rate setting unit 72 overwrites the value stored by the mode storage unit 75 with the mode 3 (step S92) and the process proceeds to step S97. When the acquired usage of the write cache area 31 is not the threshold value Tclimit or more (No in step S91), the transmission rate setting unit 72 determines whether the acquired usage of the write cache area 31 is the threshold value Tc3 or less (step S93). When the usage of the write cache area 31 is the threshold value Tc3 or less (Yes in step S93), the transmission rate setting unit 72 overwrites the value stored by the mode storage unit 75 with the mode 1 (step S94) and the process proceeds to step S97. When the usage of the write cache area 31 is not the threshold value Tc3 or less (No in step S93), step S94 is skipped and the process proceeds to step S97.

When the mode stored in the mode storage unit 75 is not the modes 0 to 2 (No in step S82, No in step S83, and No in step S84), the mode 3 is stored in the mode storage unit 75. In this case, the transmission rate setting unit 72 determines whether the acquired usage of the write cache area 31 is the threshold value Tclimit or less (step S95). When the usage of the write cache area 31 is the threshold value Tclimit or less (Yes in step S95), the transmission rate setting unit 72 overwrites the value stored by the mode storage unit 75 with the mode 2 (step S96) and the process proceeds to step S97. When the usage of the write cache area 31 is not the threshold value Tclimit or less (No in step S95), step S96 is skipped and the process proceeds to step S97.

Figure 19:
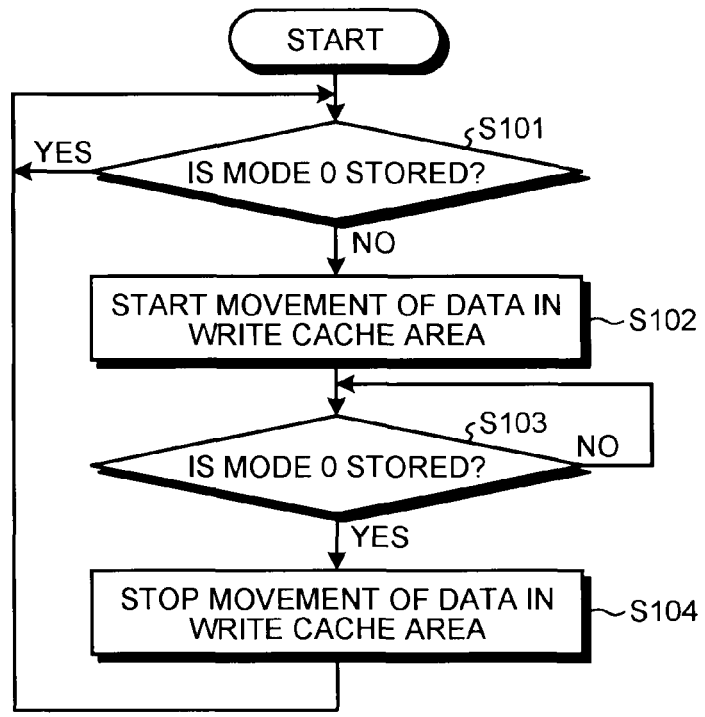
FIG. 19 is a flowchart illustrating an operation of moving write data to a NAND memory by a resource managing unit.

FIG. 19 is a flowchart illustrating an operation of moving the write data cached in the write cache area 31 to the NAND memory 50 by the resource managing unit 76. As illustrated in FIG. 19, first, the resource managing unit 76 determines whether the mode storage unit 75 stores the mode 0 (step S101). When the mode storage unit 75 does not store the mode 0 (No in step S101), the resource managing unit 76 starts the movement of the data in the write cache area 31 (step S102). When the mode storage unit 75 stores the mode 0 (Yes in step S101), the resource managing unit 76 continuously executes the determination process of step S101 until the storage content of the mode storage unit 75 becomes the modes other than the mode 0.

The resource managing unit 76 determines whether the mode storage unit 75 stores the mode 0 again, after the movement of the data starts (step S103). When the mode storage unit 75 stores the mode 0 (Yes in step S103), the resource managing unit 76 stops the movement of the data (step S104) and executes the determination process of step S101. In step S103, when the mode storage unit 75 does not store the mode 0 (No in step S103), the resource managing unit 76 continuously executes the determination process of step S103 until the storage content of the mode storage unit 75 becomes the mode 0.

Figure 20:
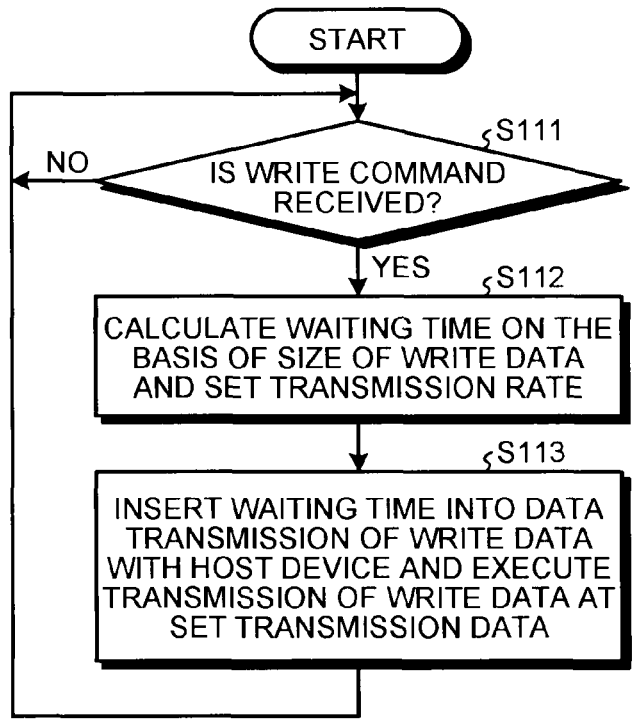
FIG. 20 is a flowchart illustrating an operation of executing data transmission by a transmission control unit.

FIG. 20 is a flowchart illustrating an operation of executing the data transmission by the transmission control unit 73. As illustrated in FIG. 20, first, the transmission control unit 73 determines whether a write command is received (step S111). When the write command is not received (No in step S111), the transmission control unit 73 executes the determination process of step S111 until the write command is received.

In step S111, when it is determined that the write command is received (Yes in step S111), the transmission control unit 73 calculates the waiting time by applying the size of the write requested data by the write command and the setting value of the transmission rate calculated by the transmission rate setting unit 72 to the relation equation of Equation 1 (step S112). Similar to the first embodiment, in Equation 1, the waiting time may be calculated by setting the execution time to zero.

After step S112, the transmission control unit 73 inserts waiting period for the waiting time calculated in step S112 into period of the data transmission of the write requested data and executes the data transmission of the write requested data according to the setting value of the transmission rate (step S113). If the data transmission of step S113 is completed, the transmission control unit 73 executes the determination process of step S111.

As such, according to the third embodiment of the invention, since the setting value of the transmission rate is calculated on the basis of the usage of the write cache area 31, the response time with respect to the write command can be prevented from excessively increasing, as compared with the case in which the execution of the command is in standby until the process of moving the data in the write cache area 31 to the NAND memory 50 ends.

In the third embodiment, the threshold values and/or the values of the transmission rates that are used to calculate the setting value of the transmission rate may be changed according to the command reception interval.

Figure 21:
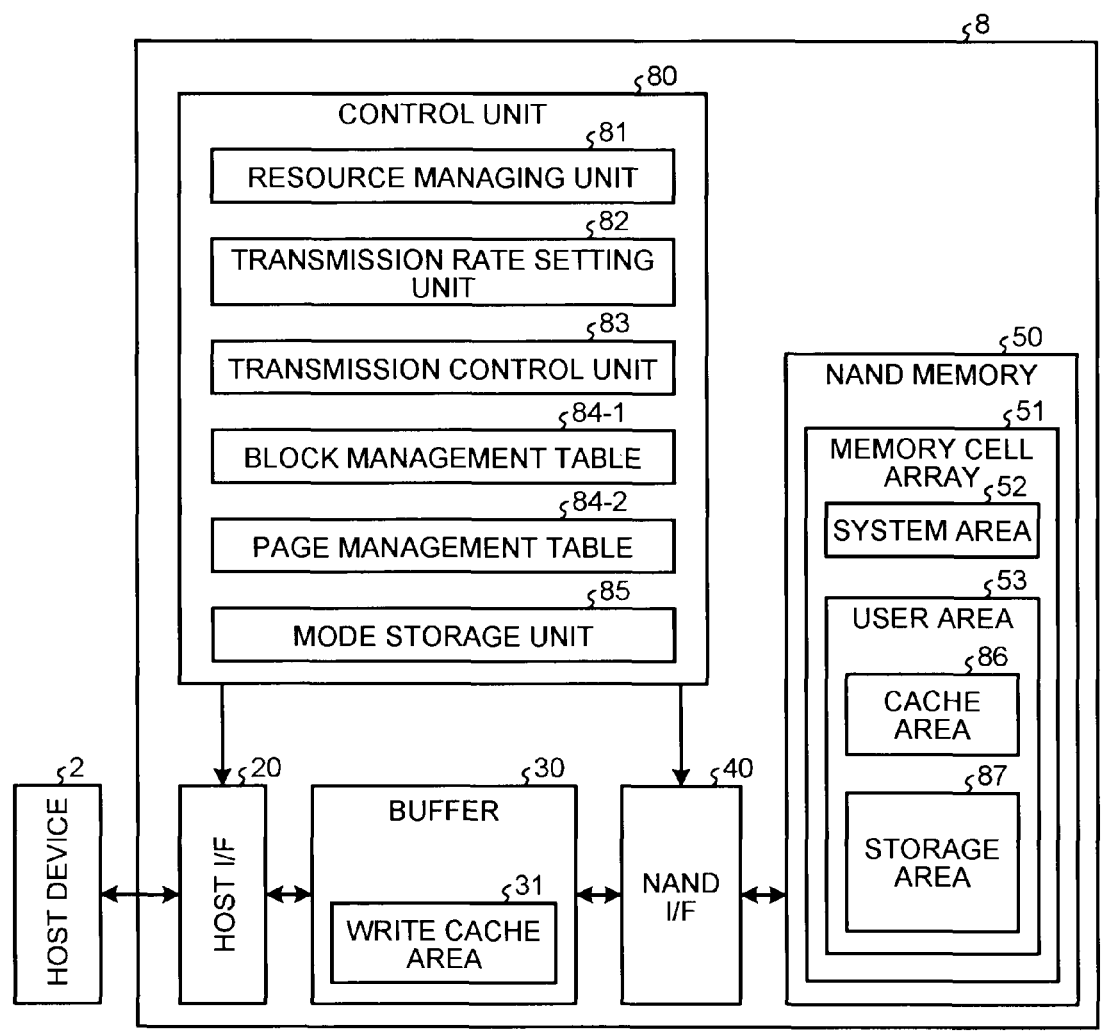
FIG. 21 is a block diagram illustrating the configuration of an SSD according to a fourth embodiment.

FIG. 21 is a block diagram illustrating the configuration of an SSD according to the fourth embodiment of the invention. In the fourth embodiment, the same components as those of the first embodiment are denoted by the same reference numerals and the redundant description will not be repeated.

As illustrated in FIG. 21, an SSD 8 includes a control unit 80, a host interface (I/F) 20, a buffer 30, a NAND I/F 40, and a NAND memory 50.

The buffer 30 includes a write cache area 31 that caches write data received from the host device 2 through the host I/F 20.

The NAND memory 50 includes a memory cell array 51 that is configured using a NAND-type non-volatile storage element. In the memory cell array 51, a system area 52 and a user area 53 where the write dada from the host device 2 is stored are secured. In the user area 53, a cache area 86 where data having a page size is cached and a storage area 87 where data having a block size is stored are further secured. An association relation between the physical addresses and the logical addresses about the data in the storage area 87 is managed by a block management table 84-1. An association relation between the physical addresses and the logical addresses about the data in the cache area 86 is managed by a page management table 84-2. The data of a unit of page in the write cache area 31 is first moved to the cache area 86. If the data in the cache area 86 increases, the corresponding data is merged with another data where the logical address is continuous and the merged data is written in an empty block constituting the storage area 87. Hereinafter, this process is called NAND reclaiming operation.

Figure 22A:
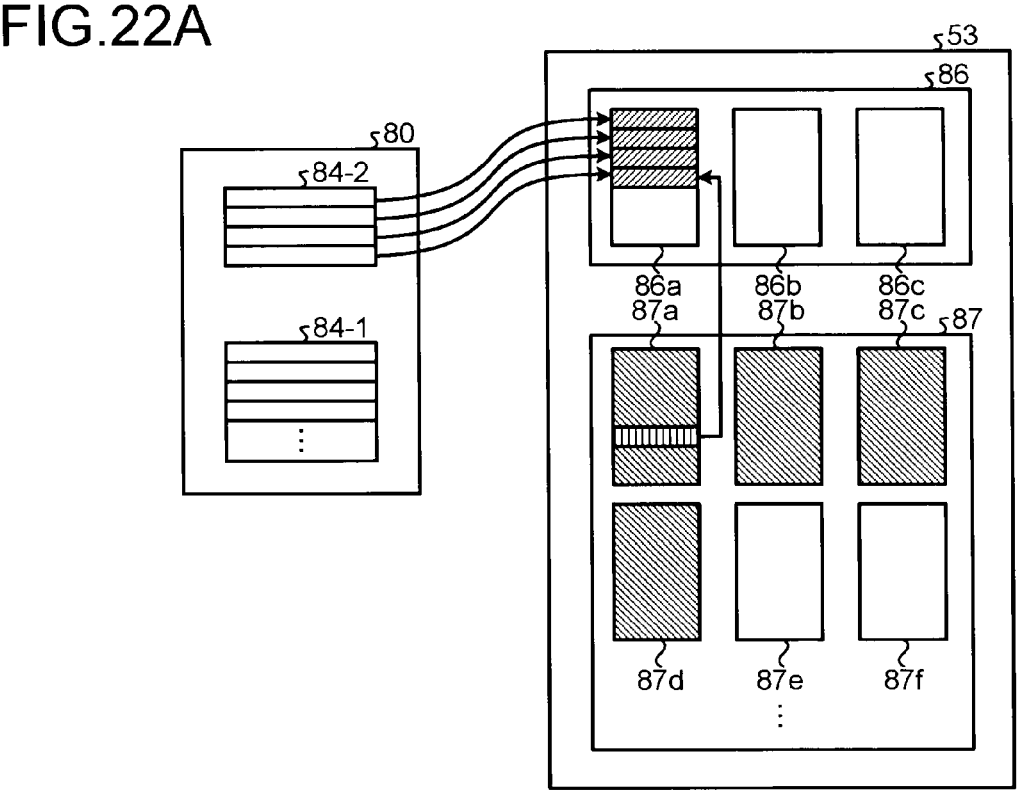
FIG. 22A is a diagram illustrating a process of NAND reclaiming operation.
Figure 22B:
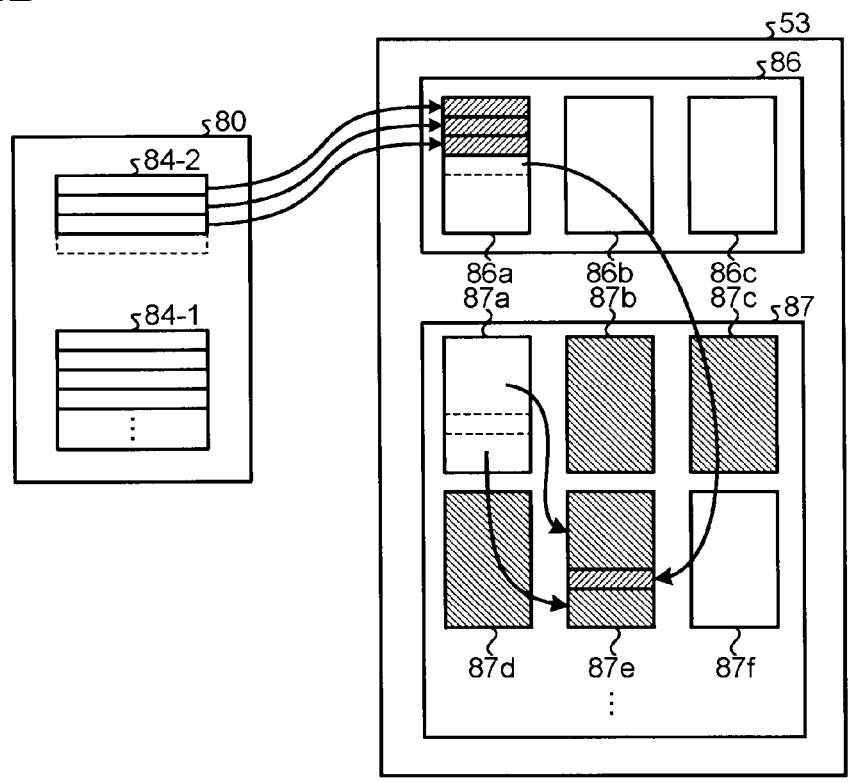
FIG. 22B is a diagram illustrating a process of the NAND reclaiming operation.

FIGS. 22A and 22B are diagrams illustrating a process of the NAND reclaiming operation. FIG. 22A illustrates a state before the NAND reclaiming operation is executed. In FIG. 22A, the cache area 86 includes three blocks (blocks 86a to 86c) and the storage area 87 includes plural blocks (blocks 87a to 87f, . . . ). The control unit 80 includes the block management table 84-1 and the page management table 84-2. In the cache area 86, data corresponding to four pages is stored in the block 86a. In the page management table 84-2, four entries that show association relations of the logical addresses and the physical addresses about the data corresponding to the four pages stored in the block 86a are registered. In the storage area 87, writing of the blocks 87a to 87d is completed, and the block 87a of the blocks 87a to 87d is in a state that is invalidated by recording data corresponding to one page. The recorded data corresponding to one page is stored in the fourth page of the block 86a.

FIG. 22B illustrates a state after the NAND reclaiming operation is executed with respect to the data stored in the fourth page of the block 86a. In FIG. 22A, the data of which the logical address is continuous to the data stored in the fourth page of the block 86a is stored in the block 87a. In FIG. 22B, the data stored in the fourth page of the block 86a and the data stored in the block 87a are read and merged and the merged data is written as data having a block size in the block 87e to be the empty block. In addition, the contents of the block 87a are erased and the block 87a becomes the empty block. The data that is stored in the fourth page of the block 86a is invalidated and the entry corresponding to the invalidated data in the page management table 84-2 is deleted. The invalid data in the block 86a may be erased after all of the data in the same block is invalidated or may be erased after the valid data is moved to another empty block (for example, block 86b).

As such, the size of the page management table 84-2 increases or decreases according to the amount of data stored in the cache area 86. In the fourth embodiment, the storage area where the page management table 84-2 is stored is regarded as the resource and the limitation value of the transmission rate is calculated according to the size of the page management table 84-2. In this case, the transmission rate is calculated using the size of the page management table 84-2 as the use resource amount. However, instead of the size, the use rate of the area where the corresponding table is stored or the number of entries may be used.

The control unit 80 includes a resource managing unit 81, the transmission rate setting unit 82, a transmission control unit 83, a block management table 84-1, a page management table 84-2, and a mode storage unit 85.

As described above, the block management table 84-1 and the page management table 84-2 are table where the association relations of the logical addresses and the physical addresses are recorded, and are stored by a storage device that functions as a volatile memory such as a DRAM or a static random access memory (SRAM).

The transmission rate setting unit 82 calculates the setting value of the transmission rate using the size of the page management table 84-2 and the predetermined threshold values.

Figure 23:
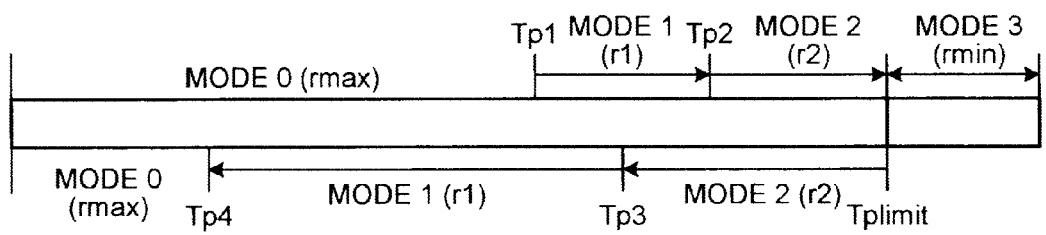
FIG. 23 is a diagram illustrating a relation between a size of a page management table and the transmission rate.

FIG. 23 is a diagram illustrating a relation between the size of the page management table 84-2 and the transmission rate. In FIG. 23, as comes close to a right direction of a plane of paper, the size of the page management table 84-2 increases and the empty area of the write cache area 31 decreases. As illustrated in FIG. 23, the transmission rate may take rmax, r1, r2, and rmin. In this case, rmax indicates the transmission rate in a state in which the transmission rate is not limited at all, rmin indicates the transmission rate that is determined on the basis of worst response time, and a relation of rmax>r1>r2>rmin exists between the transmission rates. The transmission rate that is used to transmit data among the transmission rates rmax, r1, r2, and rmin is determined, on the basis of the comparison result of the size of the page management table 84-2 and a predetermined threshold value. If modes where the transmission rates of rmax, r1, r2, and rmin are determined are set to a mode 0, a mode 1, a mode 2, and a mode 3, a transition from the mode 0 to the mode 1, a transition from the mode 1 to the mode 2, and a transition from the mode 2 to the mode 3 are determined on the basis of the comparison results of the size of the page management table 84-2 and threshold values Tp1, Tp2, and Tplimit. In addition, a transition from the mode 3 to the mode 2, a transition from the mode 2 to the mode 1, and a transition from the mode 1 to the mode 0 are determined on the basis of the comparison results of the size of the page management table 84-2 and threshold values Tplimit, Tp3, and Tp4. A relation between the threshold values is set to Tp4<Tp1<Tp3<Tp2<Tplimit. As such, the reason why a hysteretic characteristic is set to the threshold values to determine the transition of the modes is to prevent the mode from being frequently switched by the transition of the size of the page management table 84-2 near the threshold values. However, the hysteretic characteristic may not be set to the threshold values.

The mode storage unit 85 stores values of the modes that are used by the transmission rate setting unit 82 at the time of calculating the transmission rate. The mode storage unit 85 may be held in a small memory, a register or the like.

The transmission control unit 83 controls the host I/F 20 and the NAND I/F 40 and controls data transmission between the host device 2 and the NAND memory 50. At this time, the data transmission is executed at the transmission rate set by the transmission rate setting unit 82. The transmission control unit 83 moves the write data cached in the write cache area 31 to the NAND memory 50, when data overflow is generated in the write cache area 31 or at the timing when a flash command is issued from the host device 2. Among the write data of the moving object, the write data of which the logical addresses are continuous and which has the block size is written in the storage area 87 and the write data of which the logical addresses are continuous and which does not have the block size and has the page size is written in the cache area 86.

The resource managing unit 81 executes the process of the NAND reclaiming operation.

Figure 24:
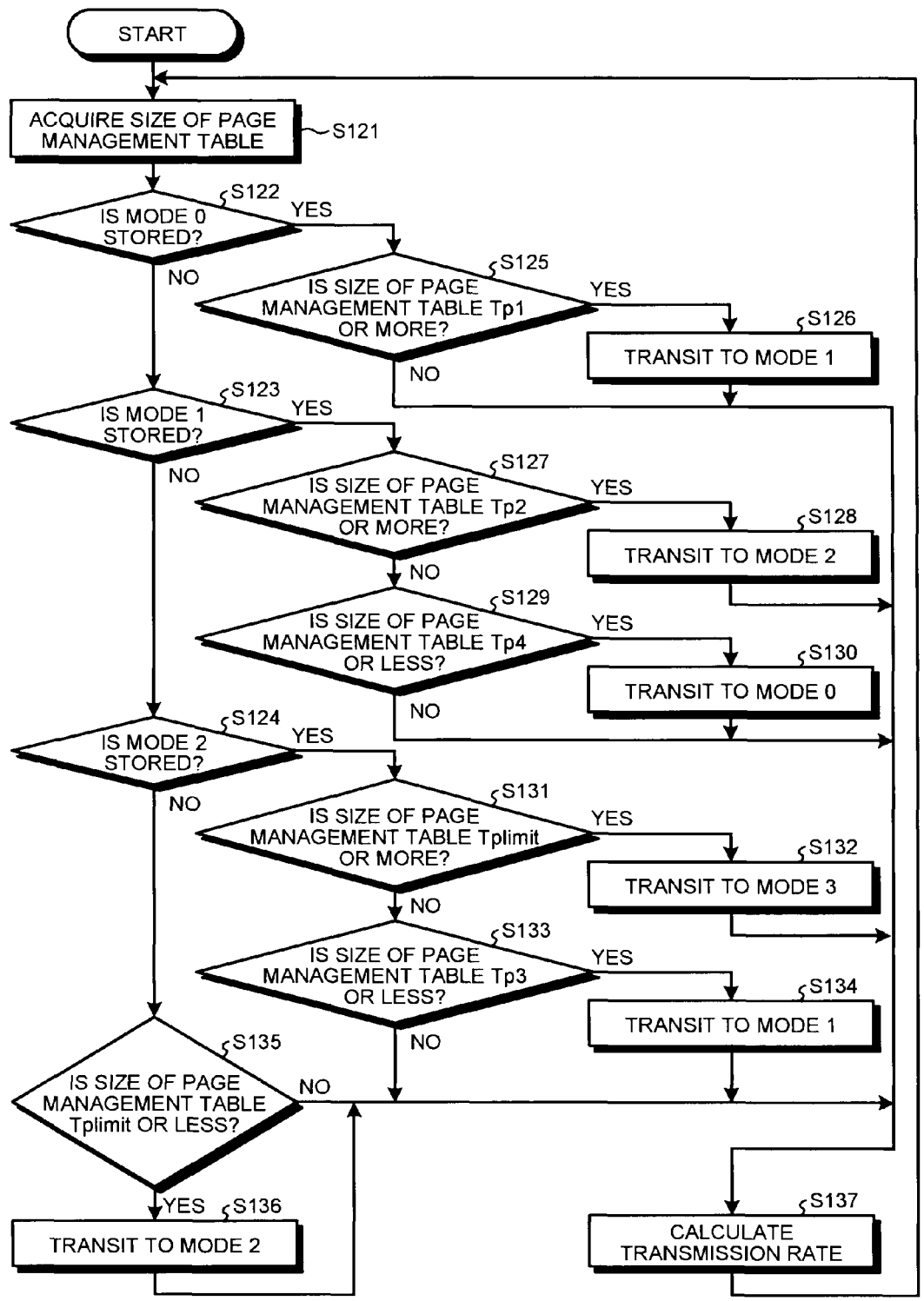
FIG. 24 is a flowchart illustrating an operation of the transmission rate setting unit.

Next, an operation of the SSD according to the fourth embodiment of the invention will be described. FIG. 24 is a flowchart illustrating an operation of the transmission rate setting unit 82.

As illustrated in FIG. 24, first, the transmission rate setting unit 82 acquires the size of the page management table 84-2 (step S121). The transmission rate setting unit 82 determines whether the mode stored by the mode storage unit 85 is the mode 0 (step S122), the mode 1 (step S123), or the mode 2 (step S124).

When the mode 0 is stored in the mode storage unit 85 (Yes in step S122), the transmission rate setting unit 82 determines whether the acquired size of the page management table 84-2 is the threshold value Tp1 or more (step S125). When the size of the page management table 84-2 is the threshold value Tp1 or more (Yes in step S125), the transmission rate setting unit 82 overwrites the value stored by the mode storage unit 85 with the mode 1 (step S126). The transmission rate setting unit 82 uses the transmission rate according to the mode stored by the mode storage unit 85 as a setting value (step S137). The setting value of the transmission rate is notified to the transmission control unit 83. If the process of step S137 is completed, the process proceeds to step S121. When the acquired size of the page management table 84-2 is not the threshold value Tp1 or more (No in step S125), step S126 is skipped and the process proceeds to step S137.

When the mode 1 is stored in the mode storage unit 85 (Yes in step S123), the transmission rate setting unit 82 determines whether the acquired size of the page management table 84-2 is the threshold value Tp2 or more (step S127). When the size of the page management table 84-2 is the threshold value Tp2 or more (Yes in step S127), the transmission rate setting unit 82 overwrites the value stored by the mode storage unit 85 with the mode 2 (step S128) and the process proceeds to step S137. When the acquired size of the page management table 84-2 is not the threshold value Tp2 or more (No in step S127), the transmission rate setting unit 82 determines whether the acquired size of the page management table 84-2 is the threshold value Tp4 or less (step S129). When the size of the page management table 84-2 is the threshold value Tp4 or less (Yes in step S129), the transmission rate setting unit 82 overwrites the value stored by the mode storage unit 85 with the mode 0 (step S130) and the process proceeds to step S137. When the size of the page management table 84-2 is not the threshold value Tp4 or less (No in step S129), step S130 is skipped and the process proceeds to step S137.

When the mode 2 is stored in the mode storage unit 85 (Yes in step S124), the transmission rate setting unit 82 determines whether the acquired size of the page management table 84-2 is the threshold value Tplimit or more (step S131). When the size of the page management table 84-2 is the threshold value Tplimit or more (Yes in step S131), the transmission rate setting unit 82 overwrites the value stored by the mode storage unit 85 with the mode 3 (step S132) and the process proceeds to step S137. When the acquired size of the page management table 84-2 is not the threshold value Tplimit or more (No in step S131), the transmission rate setting unit 82 determines whether the acquired size of the page management table 84-2 is the threshold value Tp3 or less (step S133). When the size of the page management table 84-2 is the threshold value Tp3 or less (Yes in step S133), the transmission rate setting unit 82 overwrites the value stored by the mode storage unit 85 with the mode 1 (step S134) and the process proceeds to step S137. When the size of the page management table 84-2 is not the threshold value Tp3 or less (No in step S133), step S134 is skipped and the process proceeds to step S137.

When the mode stored in the mode storage unit 85 is not the modes 0 to 2 (No in step S122, No in step S123, and No in step S124), the mode 3 is stored in the mode storage unit 85. In this case, the transmission rate setting unit 82 determines whether the acquired size of the page management table 84-2 is the threshold value Tplimit or less (step S135). When the size of the page management table 84-2 is the threshold value Tplimit or less (Yes in step S135), the transmission rate setting unit 82 overwrites the value stored by the mode storage unit 85 with the mode 2 (step S136) and the process proceeds to step S137. When the size of the page management table 84-2 is not the threshold value Tplimit or less (No in step S135), step S136 is skipped and the process proceeds to step S137.

Figure 25:
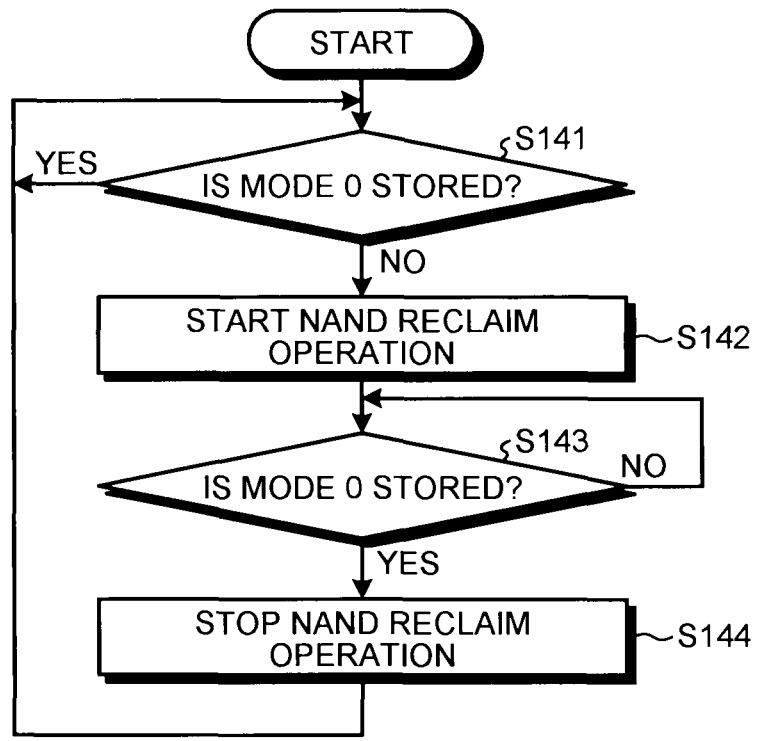
FIG. 25 is a flowchart illustrating an operation of starting/stopping a process of NAND reclaiming operation by a resource managing unit.

FIG. 25 is a flowchart illustrating an operation of starting/stopping the process of the NAND reclaiming operation by the resource managing unit 81. As illustrated in FIG. 25, first, the resource managing unit 81 determines whether the mode storage unit 85 stores the mode 0 (step S141). When the mode storage unit 85 does not store the mode 0 (No in step S141), the resource managing unit 81 starts the NAND reclaiming operation (step S142). When the mode storage unit 85 stores the mode 0 (Yes in step S141), the resource managing unit 81 continuously executes the determination process of step S141 until the storage content of the mode storage unit 85 becomes the modes other than the mode 0.

The resource managing unit 81 determines whether the mode storage unit 85 stores the mode 0 again, after the NAND reclaiming operation starts (step S143). When the mode storage unit 85 stores the mode 0 (Yes in step S143), the resource managing unit 81 stops the NAND reclaiming operation (step S144) and executes the determination process of step S141. In step S143, when the mode storage unit 85 does not store the mode 0 (No in step S143), the resource managing unit 81 continuously executes the determination process of step S143 until the storage content of the mode storage unit 85 becomes the mode 0.

Since the operation of the transmission control unit 83 is the same as that of the first embodiment, the redundant description will not be repeated.

As such, according to the fourth embodiment of the invention, the NAND memory 50 includes the cache area 86 that stores the write requested data from the host device 2 for each page and the storage area 87 that stores the data for each block, the volatile memory in the control unit 80 includes the storage area that stores the page management table 84-2 to execute the address management in the cache area 86 and the block management table 84-1 to execute the address management in the storage area 87, and the storage area that stores the page management table 84-2 is used as the resource. Therefore, the response time with respect to the write command can be prevented from excessively increasing, as compared with the case in which the execution of the command is in standby until the resource managing unit 81 ends the NAND reclaiming operation.

Even in the fourth embodiment, the threshold values and/or the values of the transmission rates that are used to calculate the setting value of the transmission rate may be changed according to the command reception interval. In the fourth embodiment, the cache area 86 is managed in a unit of page and the storage area 87 is managed in a unit of block. However, the invention is not limited thereto. If the data management unit of the storage area 87 is larger than the data management unit of the cache area 86, the NAND reclaiming operation can be executed, similar to this embodiment. For example, the cache area 86 may be managed in a unit of one time a natural number of 2 or more of the page size or may be managed in a unit of natural number times of 2 or more of the page size. In addition, the storage area 87 may be managed in a unit of one time a natural number of 2 or more of the block size or may be managed in a unit of natural number times of 2 or more of the block size. The cache area 86 may be managed by a two-valued storage system (SLC: Single Level Cell) to store information of one bit in one memory cell and the storage area 87 may be managed by a multi-valued storage system (MLC: Multi Level Cell) to store information of 2 or more bits in one memory cell.

Figure 26:
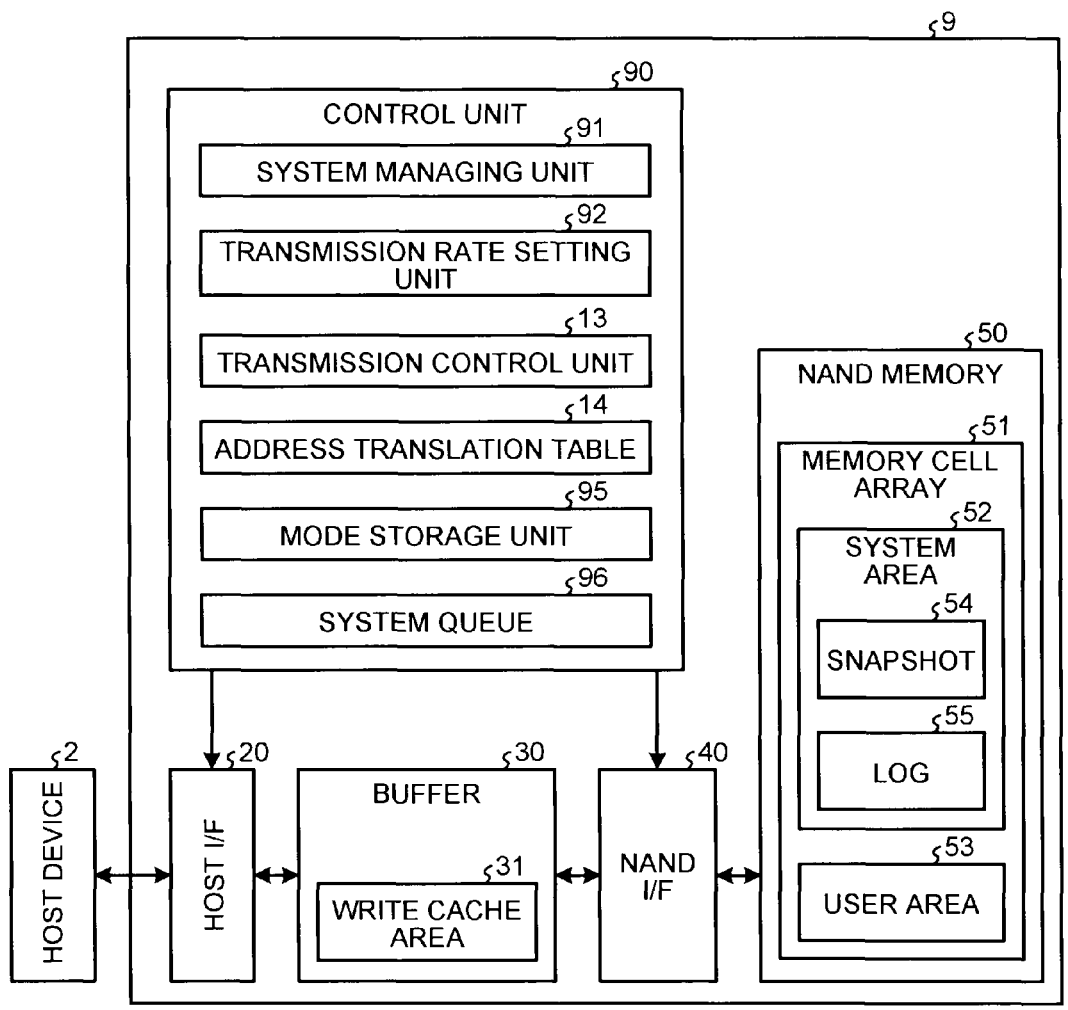
FIG. 26 is a block diagram illustrating the configuration of an SSD according to a fifth embodiment.

FIG. 26 is a block diagram illustrating the configuration of an SSD according to a fifth embodiment of the invention. In the fifth embodiment, the same components as those of the first embodiment are denoted by the same reference numerals and the redundant description will not be repeated.

As illustrated in FIG. 26, an SSD 9 includes a control unit 90, a host interface (I/F) 20, a buffer 30, a NAND I/F 40, and a NAND memory 50.

The buffer 30 includes a write cache area 31 that caches write data received from the host device 2 through the host I/F 20. The NAND memory 50 includes a memory cell array 51 that is configured using a NAND-type non-volatile storage element. In the memory cell array 51, a system area 52 and a user area 53 are secured.

The control unit 90 includes a system managing unit 91, the transmission rate setting unit 92, a transmission control unit 13, an address translation table 14, a mode storage unit 95, and a system queue 96.

The system managing unit 91 executes a process (hereinafter, referred to as system process) needed to secure reliability, such as a recovering process of damaged data, a refresh process of the memory cell array 51, and a wear leveling process of data in the memory cell array 51. The refresh process means a process that rewrites data in a block to another block, when deterioration of data such as an increase in the number of correction bits in an error correction process is detected. The wear leveling process means a process that changes data stored in a block where the number of times of rewriting (number of times of erasing) is large and data stored in a block where the number of times of rewriting (number of times of erasing) is small and equalizes the total number of times of rewriting in the NAND memory.

The system queue 96 is a storage area having a queue structure where a needed and non-executed system process is recorded. That is, when the system process needs to be executed, data where the system process to be executed is recorded is enqueued and the data is dequeued at predetermined timing by the system managing unit 91. The system managing unit 91 executes the system process that is recorded in the dequeued data. The system queue 96 is stored by a storage device functioning as a volatile memory such as a DRAM or a static random access memory (SRAM).

The transmission rate setting unit 92 calculates a setting value of the transmission rate using the amount of data in the system queue 96 and the predetermined threshold values.

Figure 27:
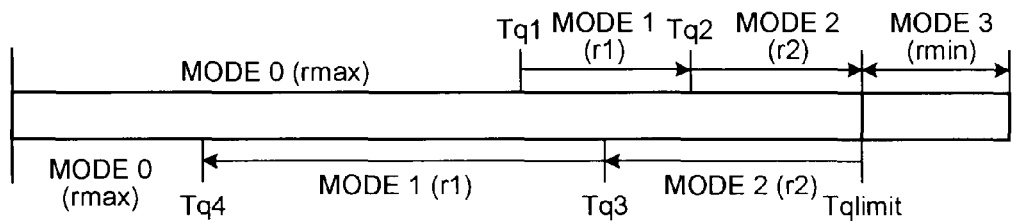
FIG. 27 is a diagram illustrating a relation between the amount of data in a system queue and the transmission rate.

FIG. 27 is a diagram illustrating a relation between the amount of data in the system queue 96 and the transmission rate. In FIG. 27, as comes close to a right direction of a plane of paper, the amount of data in the system queue 96 increases and the number of empty areas in the system queue 96 decreases. As illustrated in FIG. 27, the transmission rate may take rmax, r1, r2, and rmin. In this case, rmax indicates the transmission rate in a state in which the transmission rate is not limited at all, rmin indicates the transmission rate that is determined on the basis of worst response time, and a relation of rmax>r1>r2>rmin exists between the transmission rates. The transmission rate that is used to transmit data among the transmission rates rmax, r1, r2, and rmin is determined, on the basis of the amount of data in the system queue 96 and a predetermined threshold value. If modes where the transmission rates of rmax, r1, r2, and rmin are determined are set to a mode 0, a mode 1, a mode 2, and a mode 3, a transition from the mode 0 to the mode 1, a transition from the mode 1 to the mode 2, and a transition from the mode 2 to the mode 3 are determined on the basis of the comparison results of the amount of data in the system queue 96 and threshold values Tq1, Tq2, and Tqlimit. In addition, a transition from the mode 3 to the mode 2, a transition from the mode 2 to the mode 1, and a transition from the mode 1 to the mode 0 are determined on the basis of the comparison results of the amount of data in the system queue 96 and threshold values Tqlimit, Tq3, and Tq4. A relation between the threshold values is set to Tq4<Tq1<Tq3<Tq2<Tqlimit. As such, the reason why a hysteretic characteristic is set to the threshold values to determine the transition of the modes is to prevent the mode from being frequently switched by the transition of the amount of data in the system queue 96 near the threshold values. However, the hysteretic characteristic may not be set to the threshold values.

In this case, the amount of data in the system queue 96 is used as the amount of use resources to calculate the transmission rate. However, instead of the amount of data, a use rate of the system queue 96 may be used.

The mode storage unit 95 stores values of the modes that are used by the transmission rate setting unit 92 at the time of calculating the transmission rate. The mode storage unit 95 may be held in a small memory or a register.

Figure 28:
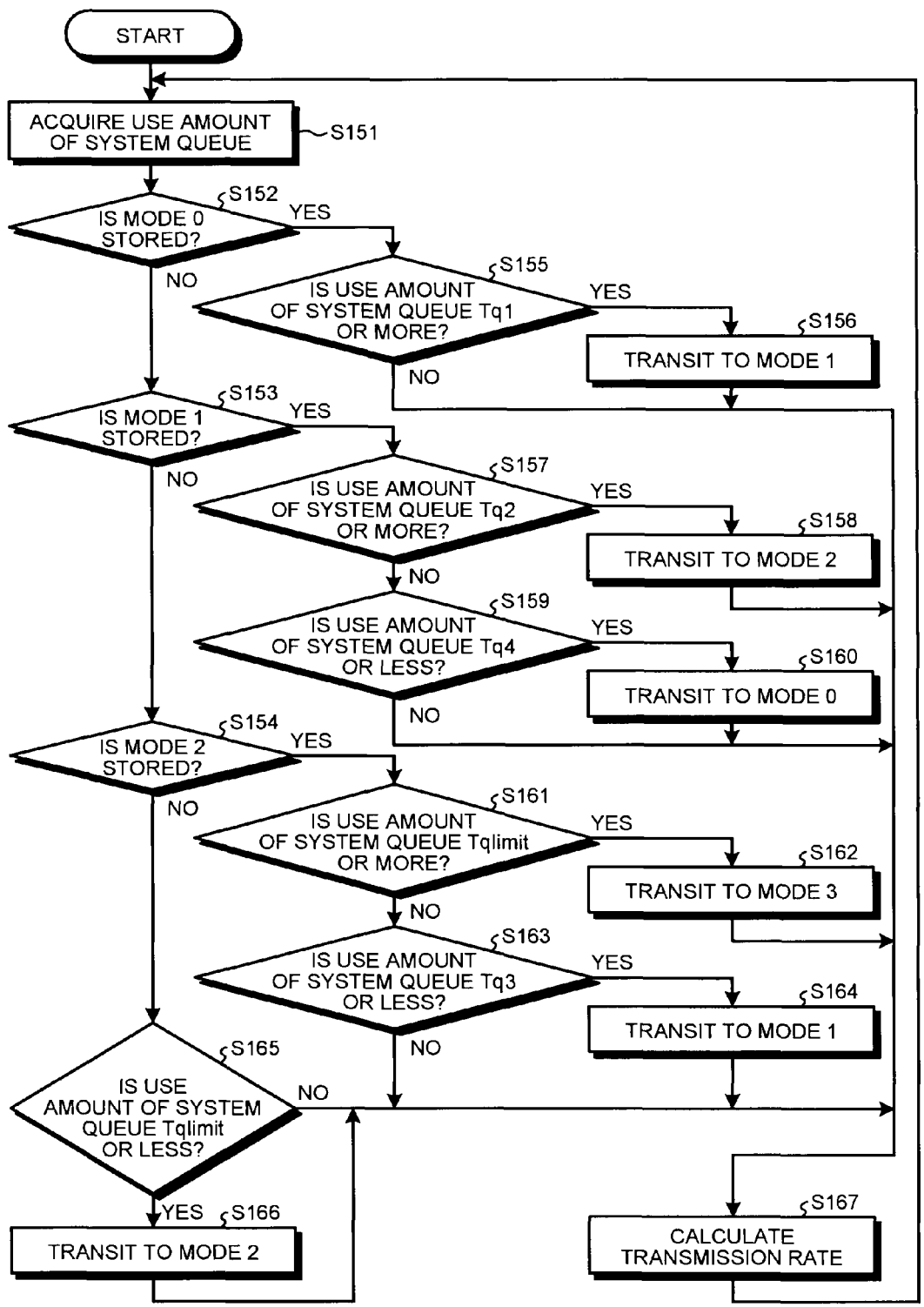
FIG. 28 is a flowchart illustrating an operation of the transmission rate setting unit.

Next, an operation of the SSD according to the fifth embodiment of the invention will be described. FIG. 28 is a flowchart illustrating an operation of the transmission rate setting unit 92.

As illustrated in FIG. 28, first, the transmission rate setting unit 92 acquires the amount of data in the system queue 96 (step S151). The transmission rate setting unit 92 determines whether the mode stored by the mode storage unit 95 is the mode 0 (step S152), the mode 1 (step S153), or the mode 2 (step S154).

When the mode 0 is stored in the mode storage unit 95 (Yes in step S152), the transmission rate setting unit 92 determines whether the acquired amount of data in the system queue 96 is the threshold value Tq1 or more (step S155). When the amount of data in the system queue 96 is the threshold value Tq1 or more (Yes in step S155), the transmission rate setting unit 92 overwrites the value stored by the mode storage unit 95 with the mode 1 (step S156). The transmission rate setting unit 92 uses the transmission rate according to the mode stored by the mode storage unit 95 as a setting value (step S167). The setting value of the transmission rate is notified to the transmission control unit 13. If the process of step S167 is completed, the process proceeds to step S151. When the acquired amount of data in the system queue 96 is not the threshold value Tq1 or more (No in step S155), step S156 is skipped and the process proceeds to step S167.

When the mode 1 is stored in the mode storage unit 95 (Yes in step S153), the transmission rate setting unit 92 determines whether the acquired amount of data in the system queue 96 is the threshold value Tq2 or more (step S157). When the amount of data in the system queue 96 is the threshold value Tq2 or more (Yes in step S157), the transmission rate setting unit 92 overwrites the value stored by the mode storage unit 95 with the mode 2 (step S158) and the process proceeds to step S167. When the acquired amount of data in the system queue 96 is not the threshold value Tq2 or more (No in step S157), the transmission rate setting unit 92 determines whether the acquired amount of data in the system queue 96 is the threshold value Tq4 or less (step S159). When the amount of data in the system queue 96 is the threshold value Tq4 or less (Yes in step S159), the transmission rate setting unit 92 overwrites the value stored by the mode storage unit 95 with the mode 0 (step S160) and the process proceeds to step S167. When the amount of data in the system queue 96 is not the threshold value Tq or less (No in step S159), step S160 is skipped and the process proceeds to step S167.

When the mode 2 is stored in the mode storage unit 95 (Yes in step S154), the transmission rate setting unit 92 determines whether the acquired amount of data in the system queue 96 is the threshold value Tqlimit or more (step S161). When the amount of data in the system queue 96 is the threshold value Tqlimit or more (Yes in step S161), the transmission rate setting unit 92 overwrites the value stored by the mode storage unit 95 with the mode 3 (step S162) and the process proceeds to step S167. When the acquired amount of data in the system queue 96 is not the threshold value Tqlimit or more (No in step S161), the transmission rate setting unit 92 determines whether the acquired amount of data in the system queue 96 is the threshold value Tq3 or less (step S163). When the amount of data in the system queue 96 is the threshold value Tq3 or less (Yes in step S163), the transmission rate setting unit 92 overwrites the value stored by the mode storage unit 95 with the mode 1 (step S164) and the process proceeds to step S167. When the amount of data in the system queue 96 is not the threshold value Tq3 or less (No in step S163), step S164 is skipped and the process proceeds to step S167.

When the mode stored in the mode storage unit 95 is not the modes 0 to 2 (No in step S152, No in step S153, and No in step S154), the mode 3 is stored in the mode storage unit 95. In this case, the transmission rate setting unit 92 determines whether the acquired amount of data in the system queue 96 is the threshold value Tqlimit or less (step S165). When the amount of data in the system queue 96 is the threshold value Tqlimit or less (Yes in step S165), the transmission rate setting unit 92 overwrites the value stored by the mode storage unit 95 with the mode 2 (step S166) and the process proceeds to step S167. When the amount of data in the system queue 96 is not the threshold value Tqlimit or less (No in step S165), step S166 is skipped and the process proceeds to step S167.

Figure 29:
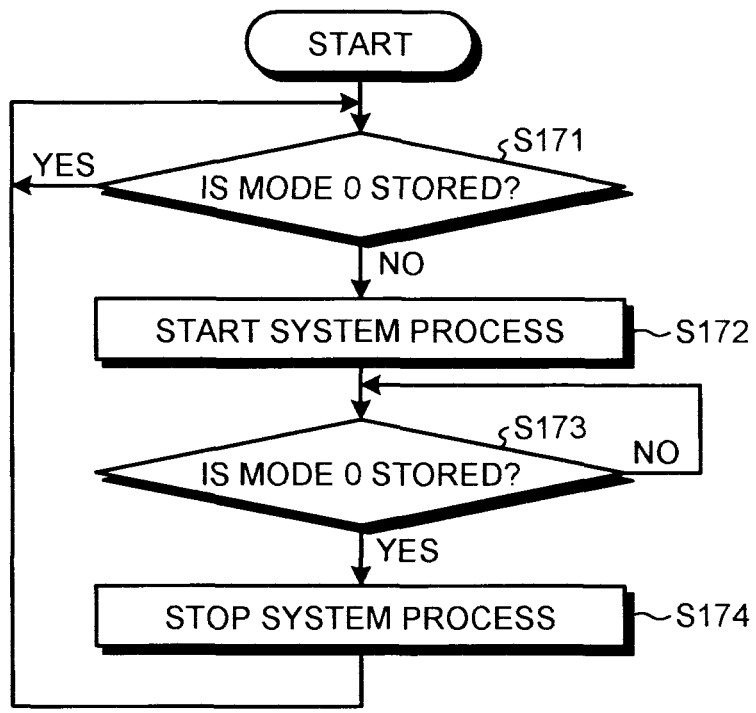
FIG. 29 is a flowchart illustrating an operation of starting/stopping a system process by a system managing unit.

FIG. 29 is a flowchart illustrating an operation of starting/stopping the system process by the system managing unit 91. As illustrated in FIG. 29, first, the system managing unit 91 determines whether the mode storage unit 95 stores the mode 0 (step S171). When the mode storage unit 95 does not store the mode 0 (No in step S171), the system managing unit 91 starts the system process (step S172). When the mode storage unit 95 stores the mode 0 (Yes in step S171), the system managing unit 91 continuously executes the determination process of step S171 until the storage content of the mode storage unit 95 becomes the modes other than the mode 0.

The system managing unit 91 determines whether the mode storage unit 95 stores the mode 0 again, after the system process starts (step S173). When the mode storage unit 95 stores the mode 0 (Yes in step S173), the system managing unit 91 stops the system process (step S174) and executes the determination process of step S171. In step S173, when the mode storage unit 95 does not store the mode 0 (No in step S173), the system managing unit 91 continuously executes the determination process of step S173 until the storage content of the mode storage unit 95 becomes the mode 0.

Since the operation of the transmission control unit 13 is the same as that of the first embodiment, the redundant description will not be repeated.

As such, according to the fifth embodiment of the invention, the system queue 96 where the execution contents of the needed and non-executed system process are recorded is included in the non-volatile memory and the amount of data in the system queue 96 is used as the amount of use resources. Therefore, the response time with respect to the write command can be prevented from excessively increasing, as compared with the case in which the execution of the command is in standby until the system process ends.

Even in the fifth embodiment, the threshold values and/or the values of the transmission rates that are used to calculate the setting value of the transmission rate may be changed according to the command reception interval.

Figure 30:
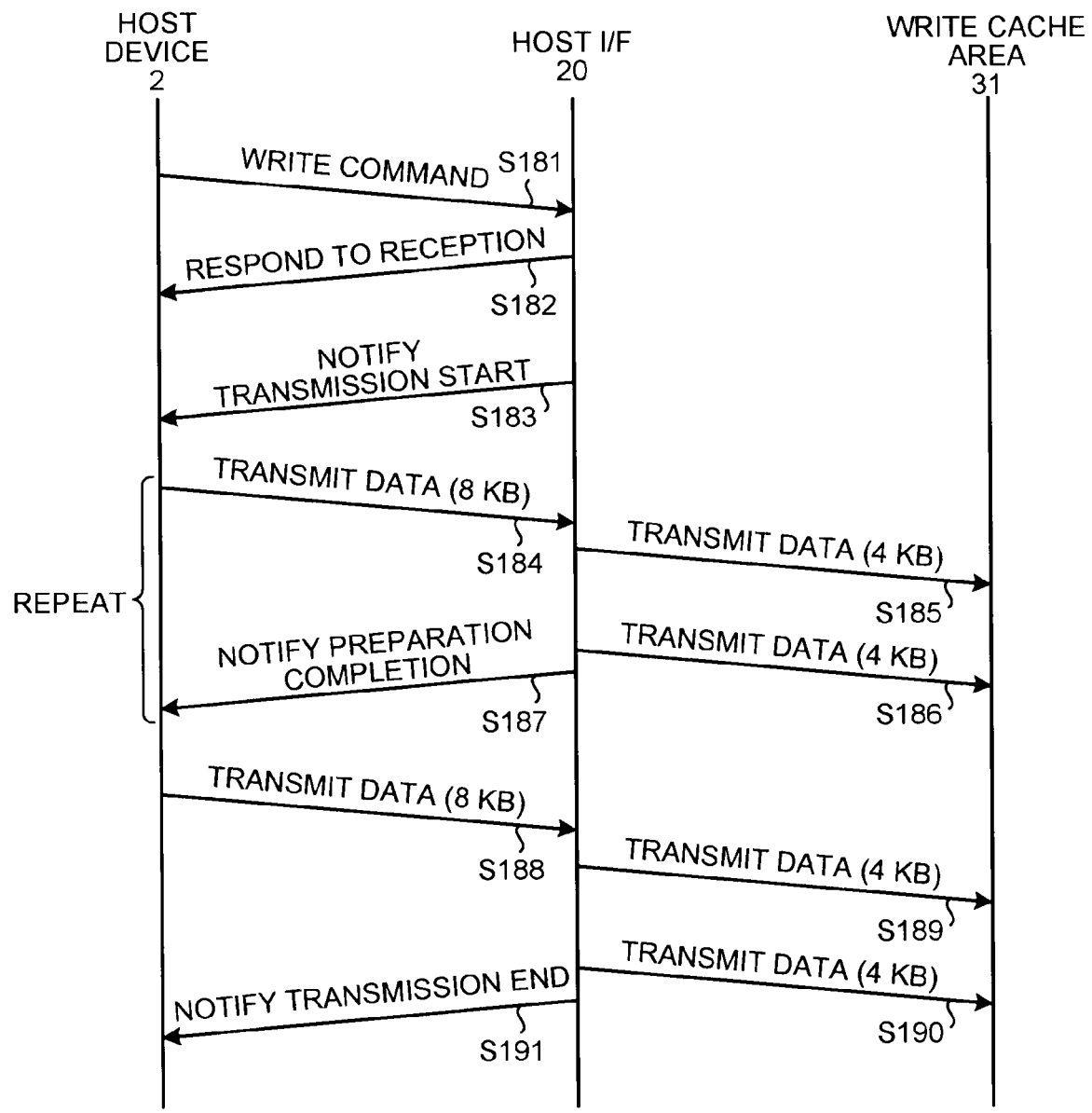
FIG. 30 is a sequence diagram illustrating an operation until write data from a host device is stored in a write cache area 31.

FIG. 30 is a sequence diagram illustrating an operation until the write data from the host device is stored in the write cache area 31.

First, if the write command is transmitted from the host device 2 to the host I/F 20 (step S181), the host I/F 20 returns a reception response indicating reception of the write command to the host device 2 (step S182). If the SSD 1 is ready to receive the data, the transmission start notification is transmitted from the host I/F 20 to the host device 2 (step S183). If the host device 2 receives the transmission start notification, the host device 2 divides the write data by the size (in this case, 8 KB) of the buffer included in the host I/F 20 and transmits the divided write data. The size of the buffer that is included in the host I/F 20 is previously notified to the host device 2, at the time of initialization.

Specifically, first, the host device 2 divides the write data by 8 KB and transmits obtained first data (step S184). The data of 8 KB that is transmitted to the host I/F 20 is temporarily stored in the buffer included in the host I/F 20. Then, the data that is stored in the buffer in the host I/F 20 is transmitted to the write cache area (steps S185 and S186). A unit size of the data that is transmitted from the host I/F 20 to the write cache area 31 may be equal to or different from a unit size of the data that is transmitted from the host device 2 to the host I/F 20. In this case, the data is transmitted in a unit of 4 KB from the host I/F 20 to the write cache area 31. If the data transmission from the host I/F 20 to the write cache area 31 is completed and the buffer in the host I/F 20 becomes empty, a preparation completion notification indicating that the next transmission data can be received is transmitted from the host I/F 20 to the host device 2 (step S187). The process of steps S184 to S187 is repeated by the number of times according to the size of the write requested data by step S181.

The host device 2 executes final data transmission that is related to the write requested data (step S188). If the data transmitted to the host I/F 20 is completely transmitted from the host I/F 20 to the write cache area 31 (steps S189 and S190), a transmission end notification indicating that the data transmission related to the write command (step S181) is completed is transmitted from the host I/F 20 to the host device 2 (step S191).

In the description of the first embodiment, the transmission control unit 13 inserts waiting period for the waiting time into period of the data transmission between the host I/F 20 and the host device 2 to limit the transmission rate of the write data from the host device 2 to the setting value of the transmission rate. In this case, as a method of inserting waiting period, the following method may be adopted.

That is, the time until the final data transmission (step S188) is completed from the host device 2 to the host I/F 20 after the first data transmission (step S184) from the host device 2 to the host I/F 20 starts is set as the execution time in Equation 1 and the time until the transmission completion notification (step S191) is transmitted after the final data transmission (step S188) is completed is set as the waiting time in Equation 1. In this way, the average transmission rate until the transmission end notification (step S191) is transmitted and received after the first data transmission (step S184) starts can be equalized to the transmission rate calculated by the transmission rate setting unit 12.

The transmission rate setting unit 12 may limit the transmission rate of the write data from the host device 2 to the setting value, using the following method. That is, the execution timing of each data transmission is controlled such that the transmission rate of each data transmission (steps S185, S186, S189, and S190) from the host I/F 20 to the write cache area 31 is equalized to the transmission rate calculated by the transmission rate setting unit 12. Specifically, the transmission control unit 13 calculates a setting value (transmission time setting value) of time that is required for each data transmission from the host I/F 20 to the write cache 31, on the basis of the following Equation 3.

$$4\text{ KB/transmission time setting value} = \text{setting value of transmission rate} \quad [\text{Equation 3}]$$

When the data transmission between the host I/F 20 and the write cache area 31 starts, a timer that counts elapsed time until the calculated transmission time setting value starts. The data transmission unit 13 waits for a start of the next data transmission of 4 KB until the timer expires even after the data transmission of 4 KB ends. Since the transmission rate of the data from the host I/F 20 to the write cache area 31 is suppressed to the transmission rate calculated by the transmission rate setting unit 12, an interval of the data transmission of 8 KB between the host I/F 20 and the host device 2 is generated. As a result, the transmission rate between the host I/F 20 and the host device 2 can be suppressed to the transmission rate calculated by the transmission rate setting unit 12.

The method of limiting the transmission rate with the host device 2 described in the sixth embodiment can be applied to any transmission control unit described in the second to fifth embodiments.

Figure 31:
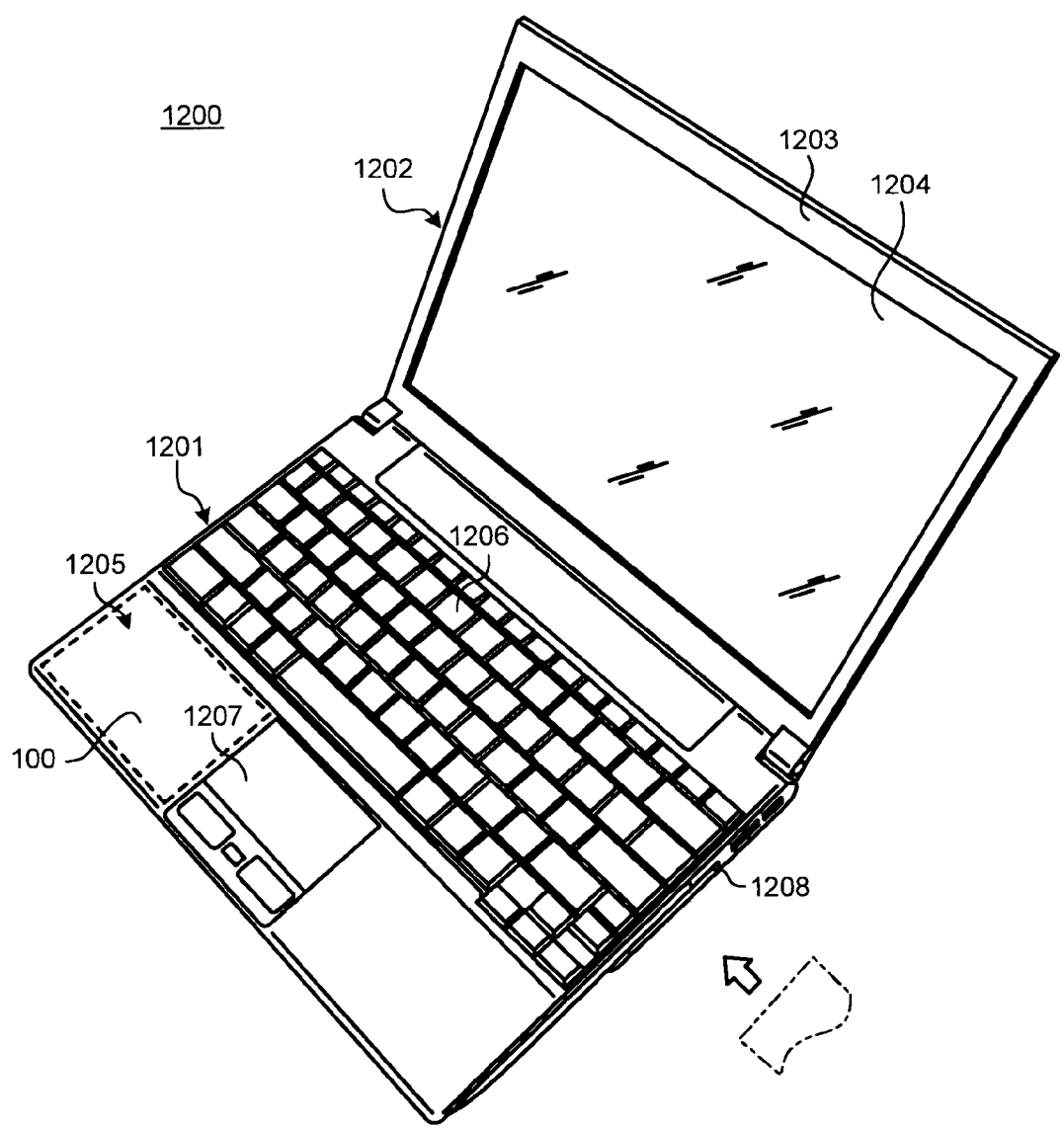
FIG. 31 is a perspective view illustrating an exterior of a personal computer.

FIG. 31 is a perspective view illustrating an example of a personal computer 1200 that is mounted with the SSD 1 according to the first embodiment. The personal computer 1200 includes a main body 1201 and a display unit 1202. The display unit 1202 includes a display housing 1203 and a display device 1204 that is accommodated in the display housing 1203.

The main body 1201 includes a casing 1205, a keyboard 1206, and a touch pad 1207 that is a pointing device. In the casing 1205, a main circuit board, an optical disk device (ODD) unit, a card slot, and the SSD 1 are accommodated.

The card slot is provided to be adjacent to a peripheral wall of the casing 1205. In the peripheral wall, an opening 1208 that faces the card slot is provided. A user can insert an additional device into the card slot from the outside of the casing 1205 through the opening 1208.

The SSD 1 may be used in a state in which the SSD 1 is mounted in the personal computer 1200 as a replacement of the HDD according to the related art or may be used as the additional device in a state in which the SSD 1 is inserted into the card slot included by the personal computer 1200.

FIG. 32 illustrates an example of the system configuration of a personal computer that is mounted with the SSD. The personal computer 1200 includes a CPU 1301, a north bridge 1302, a main memory 1303, a video controller 1304, an audio controller 1305, a south bridge 1309, a BIOS-ROM 1310, an SSD 1, an ODD unit 1311, an embedded controller/keyboard controller IC (EC/KBC) 1312, a network controller 1313, and the like.

The CPU 1301 is a processor that is provided to control an operation of the personal computer 1200 and executes an operating system (OS) that is loaded from the SSD 1 to the main memory 1303. When at least one of a reading process and a writing process can be executed with respect to a loaded optical disk in the ODD unit 1311, the CPU 1301 executes the above process.

Also, the CPU 1301 executes a system basic input output system (BIOS) that is stored in the BIOS-ROM 1310. The system BIOS is a program to control hardware in the personal computer 1200.

The north bridge 1302 is a bridge device that connects a local bus of the CPU 1301 and the south bridge 1309. In the north bridge 1302, a memory controller that controls access on the main memory 1303 is also incorporated.

The north bridge 1302 also has a function of executing communication with the video controller 1304 and communication with the audio controller 1305 through an accelerated graphics port (AGP) bus.

The main memory 1303 temporarily stores a program or data and functions as a work area of the CPU 1301. The main memory 1303 is configured using, for example, a RAM.

The video controller 1304 is a video reproducing controller that controls the display unit 1202 used as a display monitor of the personal computer 1200.

The audio controller 1305 is an audio reproducing controller that controls a speaker 1306 of the personal computer 1200.

The south bridge 1309 controls each device on a low pin count (LPC) bus 1314 and each device on a peripheral component interconnect (PCI) bus 1315. The south bridge 1309 controls the SSD 1 that is a storage device to store various kinds of software and data, through an ATA interface.

The personal computer 1200 has access on the SSD 1 in a unit of sector. A write command, a read command, and a cache flash command are input to the SSD 1 through the ATA interface.

The south bridge 1309 also has a function of controlling access on the BIOS-ROM 1310 and the ODD unit 1311.

The EC/KBC 1312 is one chip microcomputer in which an embedded controller to manage power and a keyboard controller to control the keyboard (KB) 1206 and the touch pad 1207 are integrated.

The EC/KBC 1312 has a function of turning on/off a power supply of the personal computer 1200 according to an operation of a power button by the user. The network controller 1313 is a communication device that executes communication with an external network such as the Internet.

In the SSD 1 that is mounted in the personal computer 1200, as described above, the response time with respect to the write command can be prevented from excessively increasing, as compared with the case in which the execution of the command is in standby until the reclaiming operation of the resources ends. As a result, the difference of the execution time of the command decreases. That is, the deviation can be suppressed from being generated in the response time of the command. Accordingly, convenience of the user who uses the personal computer 1200 can be improved.

In the personal computer 1200, any SSD that is described in the second to sixth embodiments can be mounted, and the same effect as that in the case in which the SSD 1 is mounted can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
   a non-volatile memory that stores data requested to be written by a host device, wherein, in the non-volatile memory, the data is erased by a block unit and writing is executed by a page unit smaller than the block unit;
   a resource managing unit that decreases a usage of blocks by performing garbage collection, when the usage of the blocks reaches a threshold value, the garbage collection corresponding to a re-arrangement of valid data from one block to another block;
   a transmission rate setting unit that calculates a setting value of a transmission rate related to reception of write data supplied from the host device based on the usage of the blocks; and
   a transmission control unit that receives the write data supplied from the host device and transmits the received write data to the non-volatile memory, wherein
   the transmission rate setting unit calculates a smaller setting value as the usage of the blocks increases and calculates a larger setting value as the usage of the block decreases, and the transmission control unit receives the write data from the host device at the transmission rate of the setting value calculated by the transmission rate setting unit, while the resource managing unit performs the garbage collection, and when a write request is received from the host device, the transmission control unit calculates waiting time on a basis of a size of the data that is requested to be written by the write request and the setting value of the transmission rate and inserts waiting period for the calculated waiting time into data transmission period of the data that is requested to be written.

2. The memory system according to claim 1, wherein the transmission rate setting unit compares the usage of the blocks and the threshold value having a hysteretic characteristic and calculates the setting value of the transmission rate.

3. The memory system according to claim 1, further comprising:
a write cache area that caches the data that is requested to be written by the host device,
wherein, when a flush request for flushing the data cached in the write cache area to the non-volatile memory is received from the host device, the transmission control unit flushes the data of a flushing target cached in the write cache area to the non-volatile memory, calculates waiting time on a basis of a size of the flushing target and the setting value of the transmission rate, and transmits a flushing completion notification with respect to the received flush request to the host device, after the calculated waiting time passes from the reception of the flush request, and
wherein in a case in which the usage of the blocks reaches the threshold value, when the transmission control unit receives the flush request, the resource managing unit performs the garbage collection while the transmission control unit does not flush the data of the flushing target during a period until the transmission control unit transmits the flushing completion notification after the transmission control unit receives the flush request.

4. The memory system according to claim 3, wherein, when the calculated waiting time related to the received flush request is shorter than worst response time, the transmission control unit sets the worst response time as the waiting time.

5. The memory system according to claim 2, wherein the transmission rate setting unit decreases the threshold value when an access frequency from the host device is lower than a setting interval and increases the threshold value when the access frequency from the host device is higher than the setting interval.

6. The memory system according to claim 1, wherein the transmission rate setting unit decreases the setting value of the transmission rate when the access frequency from the host device is lower than a setting interval and increases the setting value of the transmission rate when the access frequency from the host device is higher than the setting interval.

7. The memory system according to claim 1, wherein the transmission rate setting unit:
calculates a first setting value;
calculates a second setting value which is smaller than the first setting value in a case where the usage of the blocks exceeds a first threshold value; and calculates a third setting value which is smaller than the second setting value in a case where the usage of the blocks exceeds a second threshold value which is larger than the first threshold value.

8. A memory system, comprising:
a non-volatile memory that stores data requested to be written by a host device, wherein, in the non-volatile memory, the data is erased by a block unit and writing is executed by a page unit smaller than the block unit;
a resource managing unit that decreases a usage of blocks by performing garbage collection, when the usage of the blocks reaches a threshold value, the garbage collection corresponding to a re-arrangement of valid data from one block to another block;
a transmission rate setting unit that calculates a setting value of a transmission rate related to reception of write data supplied from the host device based on the usage of the blocks; and
a transmission control unit that receives the write data supplied from the host device and transmits the received write data to the non-volatile memory, wherein
the transmission rate setting unit calculates a first setting value, calculates a second setting value which is smaller than the first setting value in a case where the usage of the blocks exceeds a first threshold value, and calculates a third setting value which is smaller than the second setting value in a case where the usage of the blocks exceeds a second threshold value which is larger than the first threshold value,
the transmission control unit receives the write data from the host device at the transmission rate of the setting value calculated by the transmission rate setting unit, while the resource managing unit performs the garbage collection, and
when a write request is received from the host device, the transmission control unit calculates waiting time on a basis of a size of the data that is requested to be written by the write request and the setting value of the transmission rate and inserts waiting period for the calculated waiting time into data transmission period of the data that is requested to be written.

9. A memory system, comprising:
a non-volatile memory that includes a plurality of blocks and stores data requested to be written by a host device;
a resource managing unit configured to perform garbage collection, the garbage collection being an operation for generating a free block; and
a transmission control unit configured to decrease a transmission rate in response to decrement of a number of free blocks, and to increase the transmission rate in response to increment of the number of free blocks, the transmission rate being a rate of transmission of write data supplied from the host device, wherein
when a write request is received from the host device, the transmission control unit calculates waiting time on a basis of a size of the data that is requested to be written by the write request and a setting value of the transmission rate and inserts waiting period for the calculated waiting time into data transmission period of the data that is requested to be written.

* * * * *